April 21, 1931.  N. M. LOWER ET AL  1,801,561
LOCOMOTIVE STOKER
Filed June 10, 1922   20 Sheets-Sheet 1

Fig. 3.

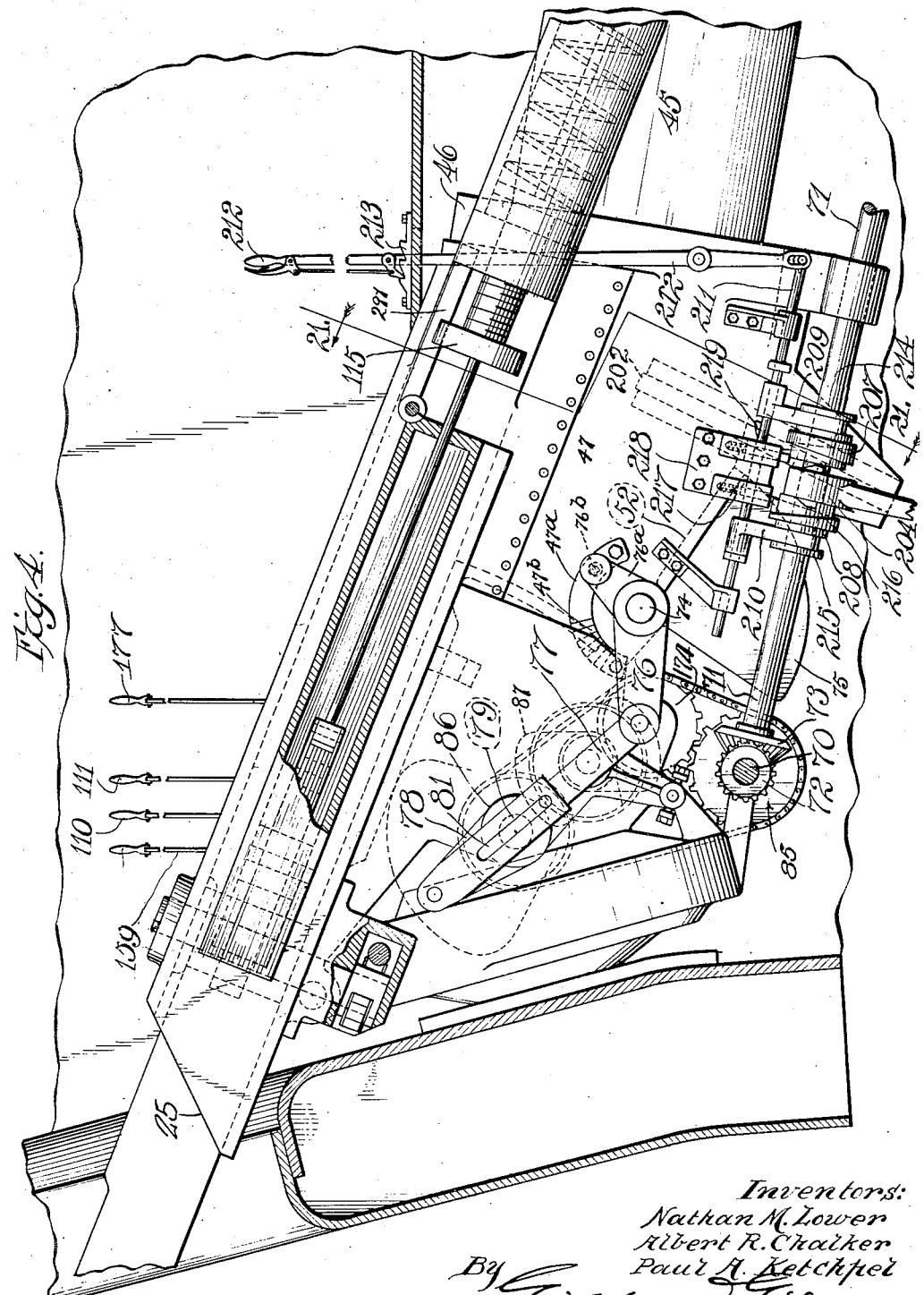

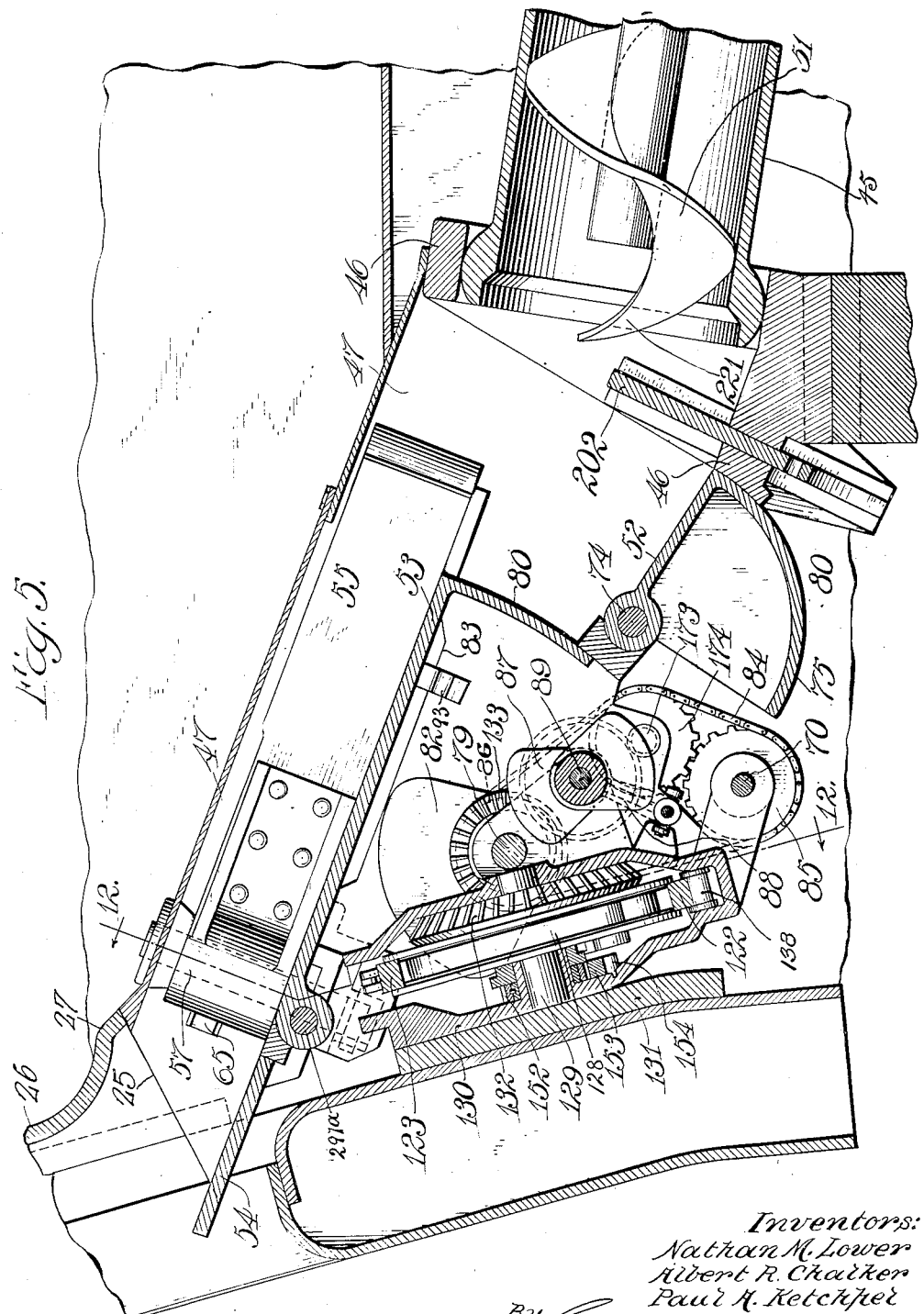

April 21, 1931.     N. M. LOWER ET AL     1,801,561
LOCOMOTIVE STOKER
Filed June 10, 1922      20 Sheets-Sheet 6
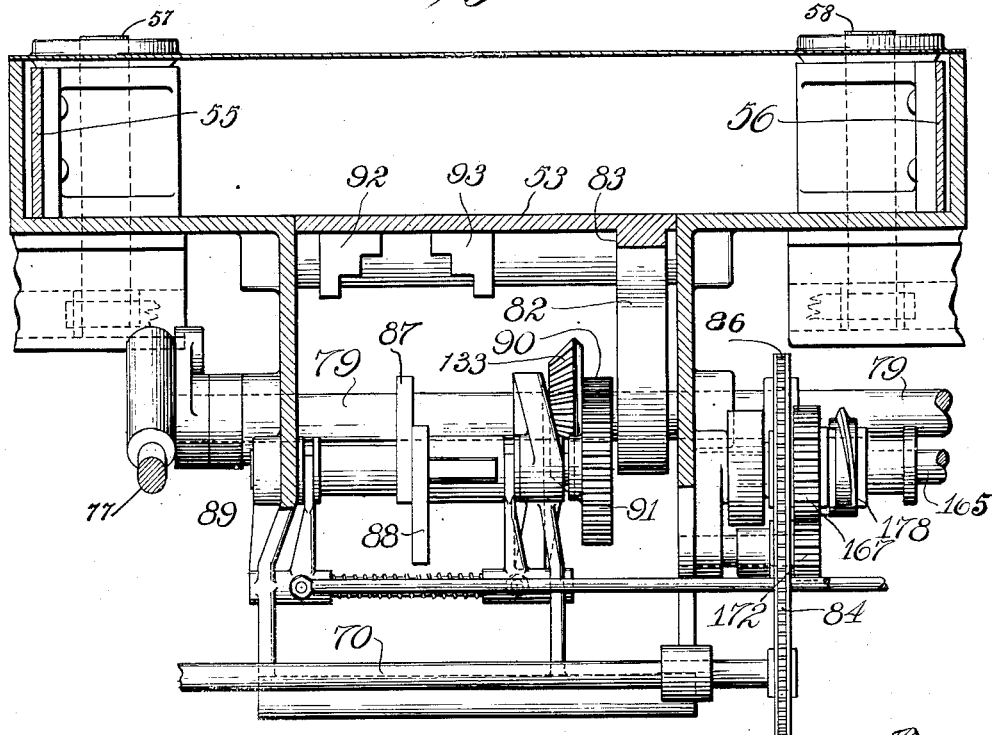
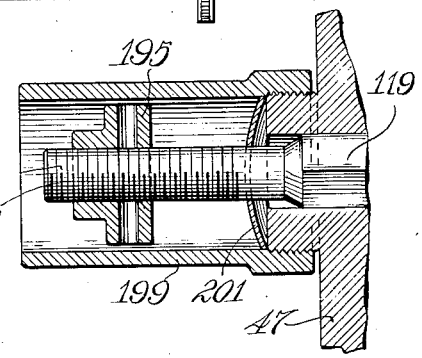
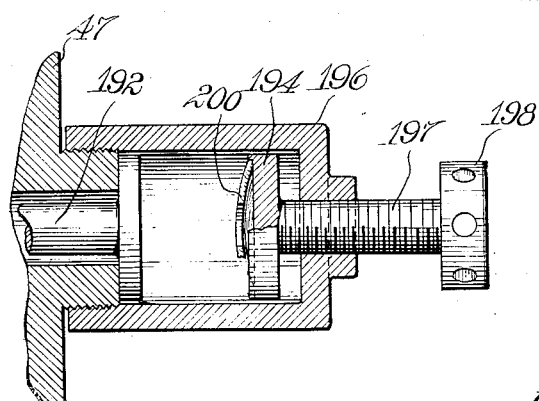
Inventors:
Nathan M. Lower
Albert R. Chalker
Paul A. Ketchpel
By
Attys.

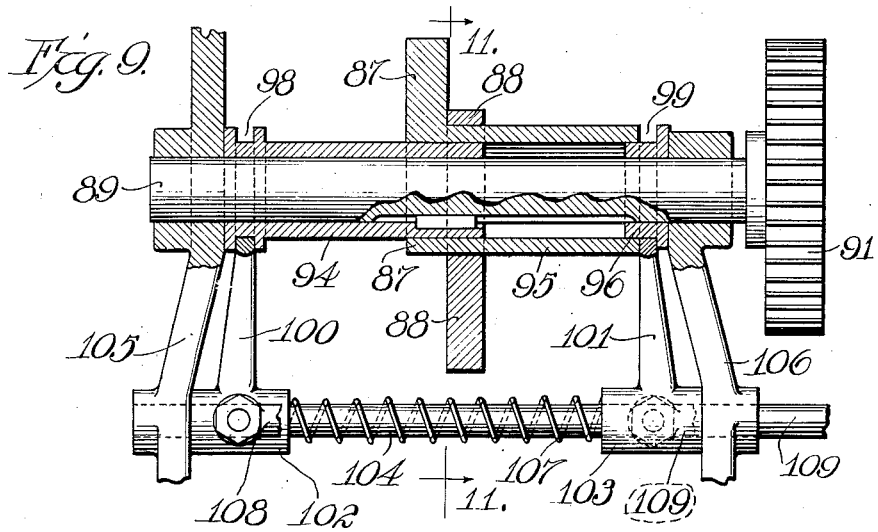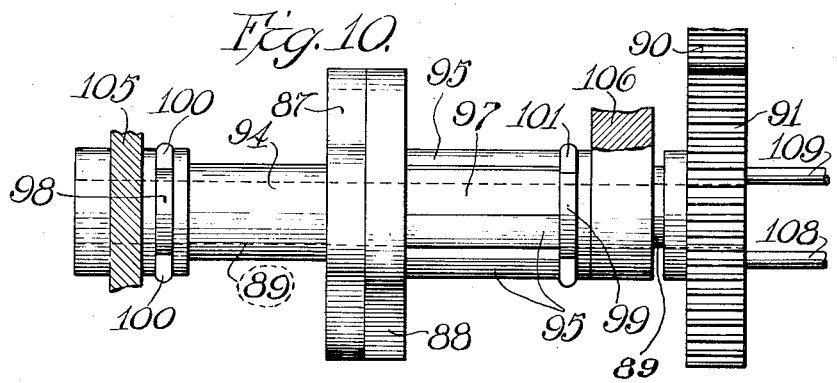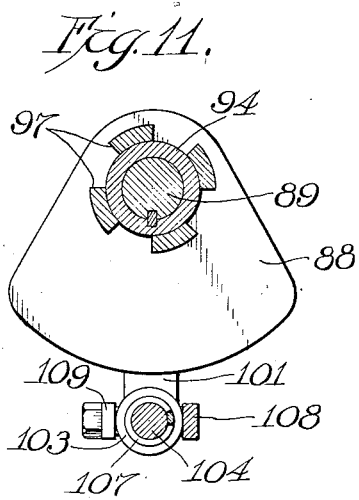

April 21, 1931.   N. M. LOWER ET AL   1,801,561
LOCOMOTIVE STOKER
Filed June 10, 1922   20 Sheets-Sheet 8

Inventors:
Nathan M. Lower
Albert R. Chalker
Paul R. Ketchpel
By Gillson & Gillson
Attys.

April 21, 1931.    N. M. LOWER ET AL    1,801,561
LOCOMOTIVE STOKER
Filed June 10, 1922    20 Sheets-Sheet 9
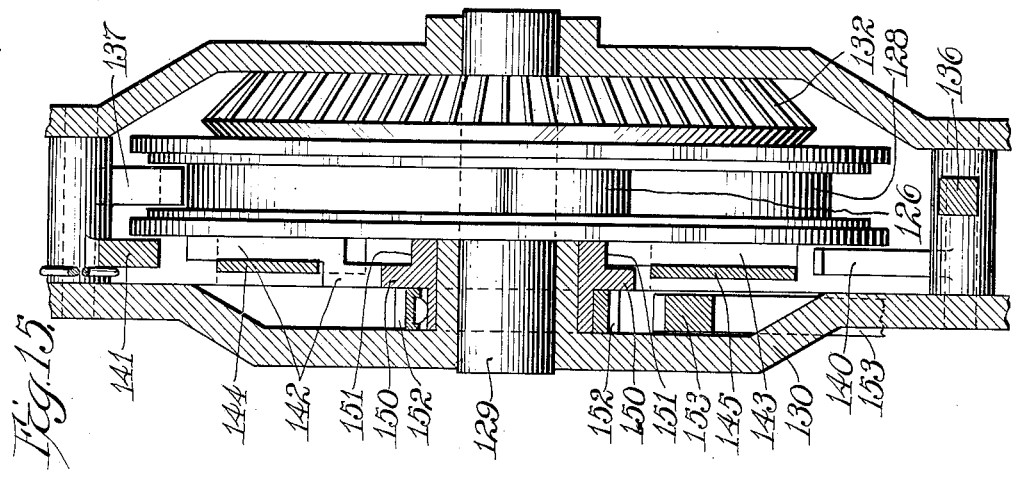
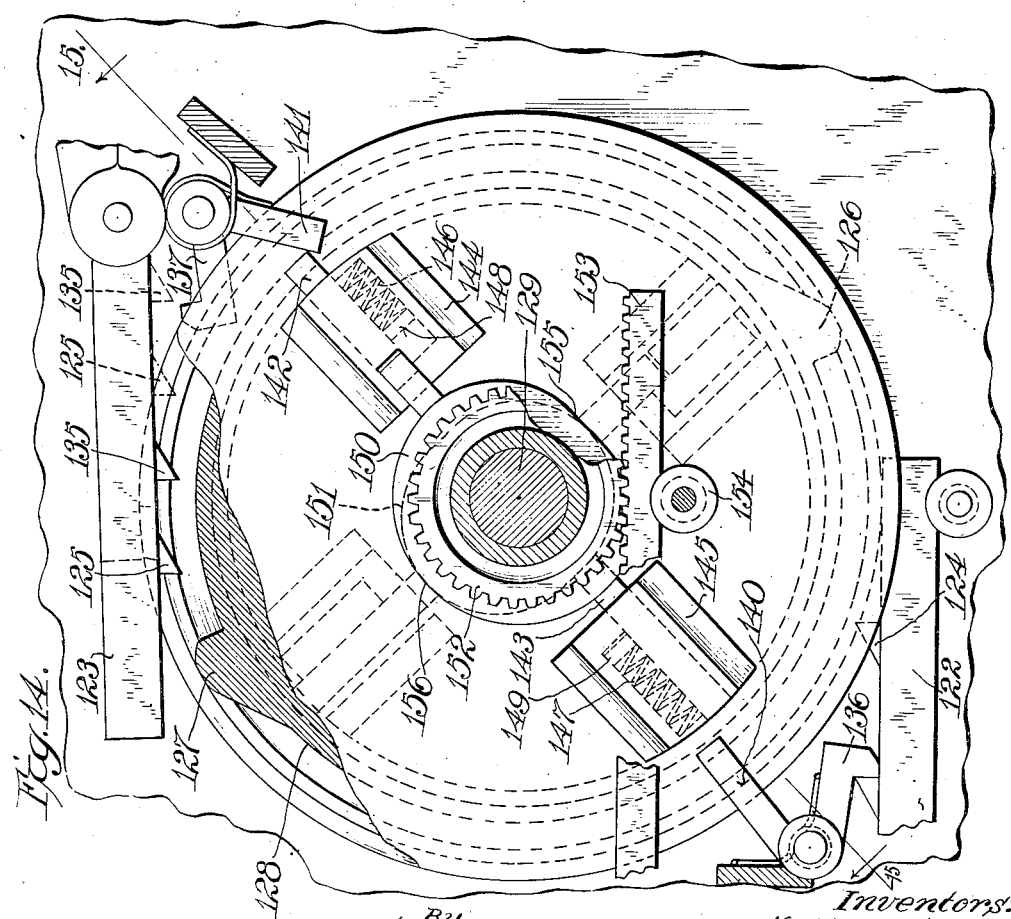

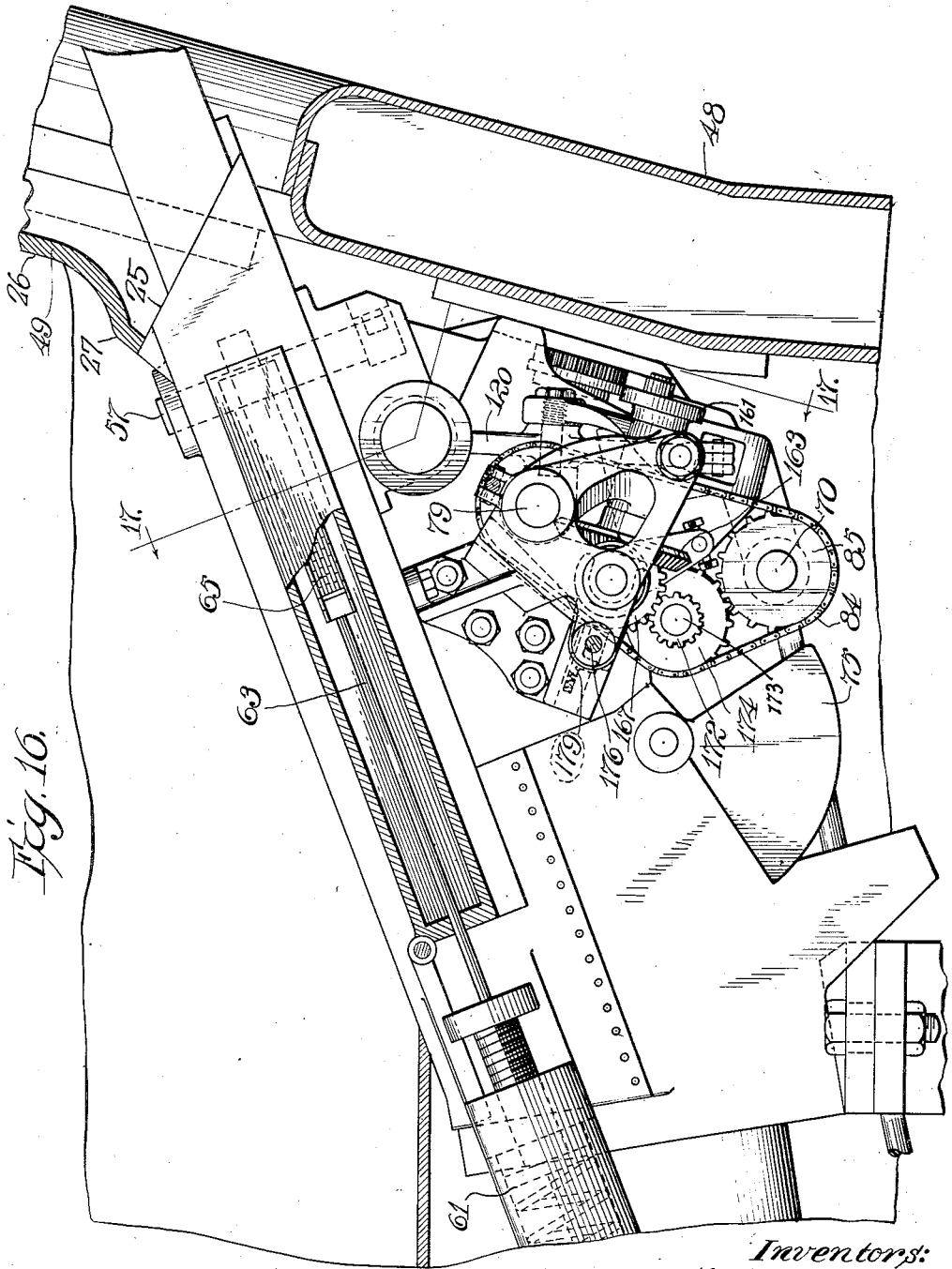

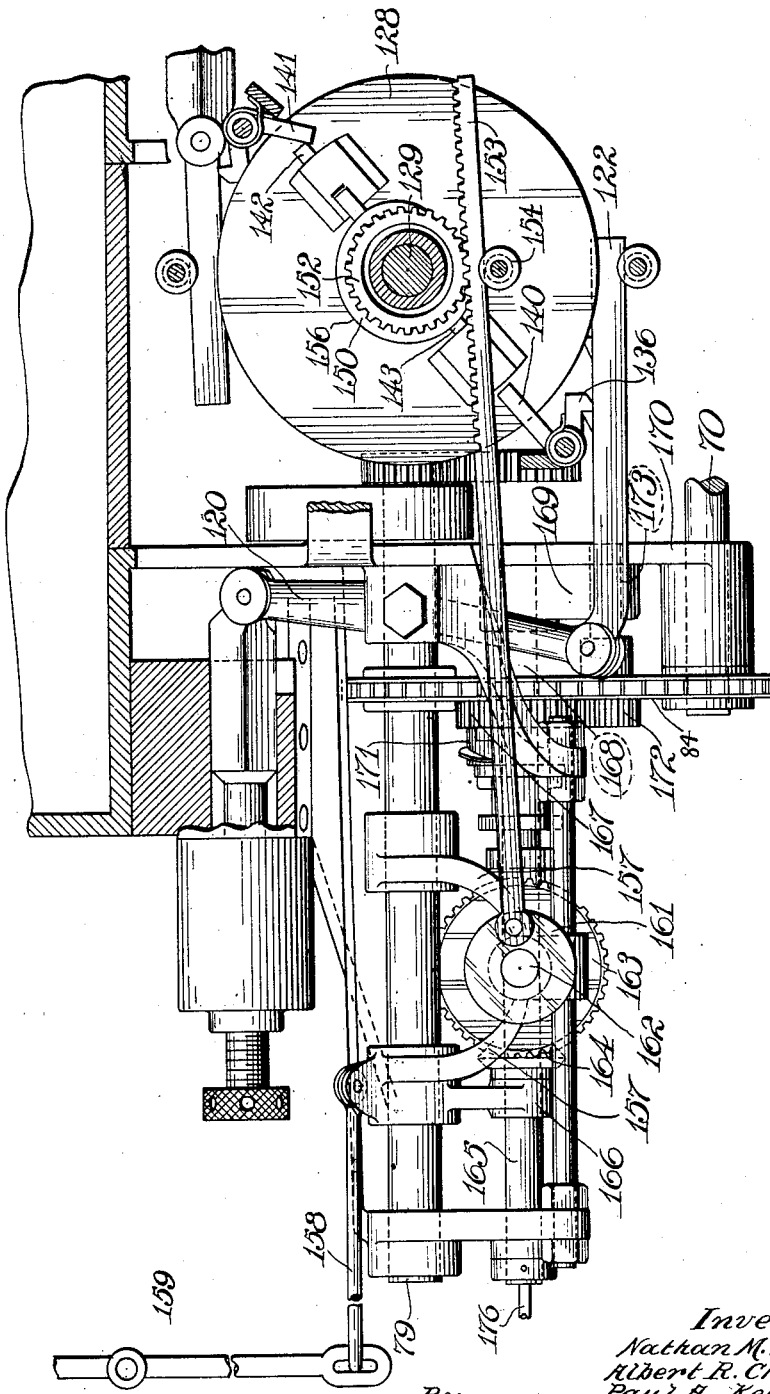

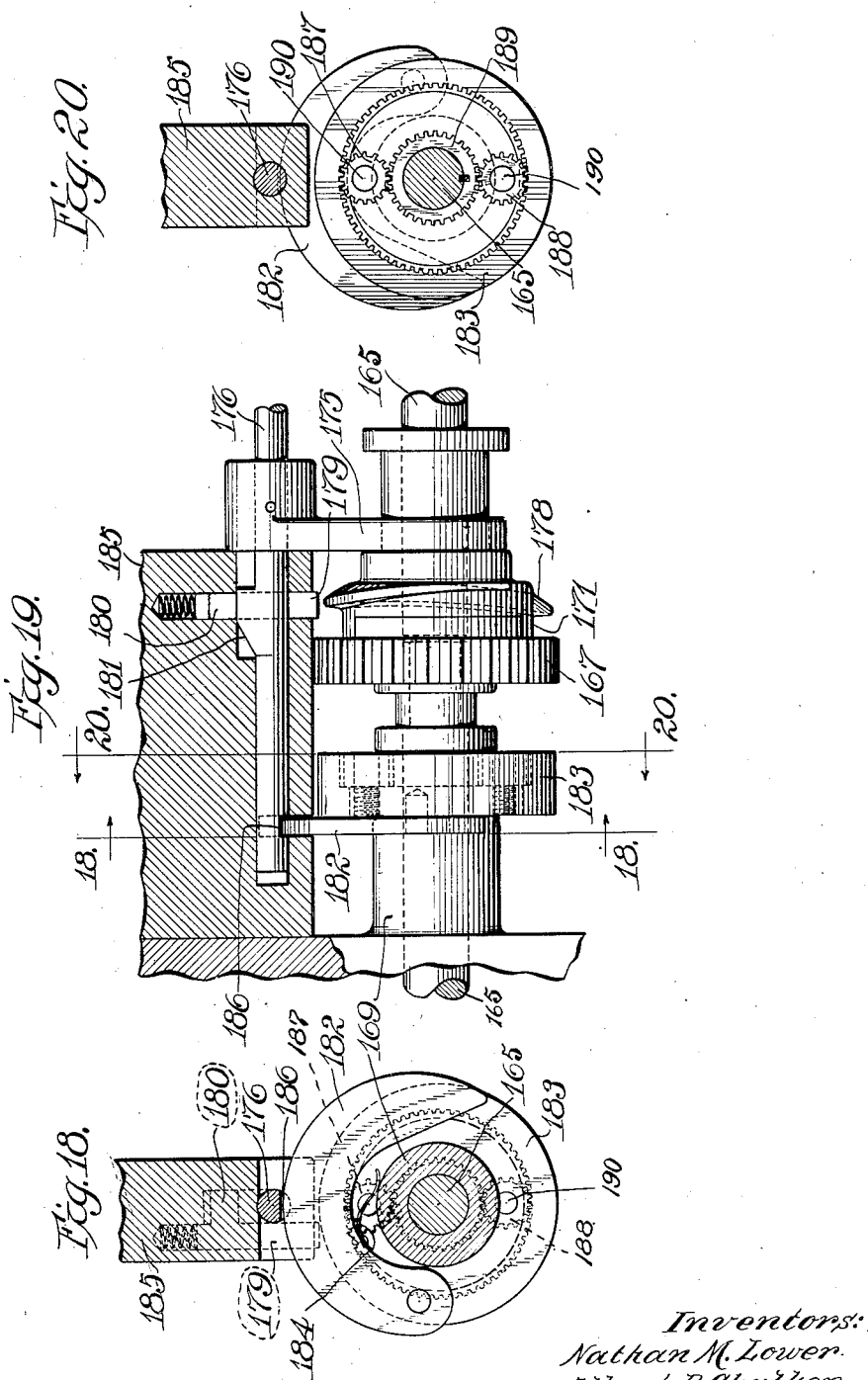

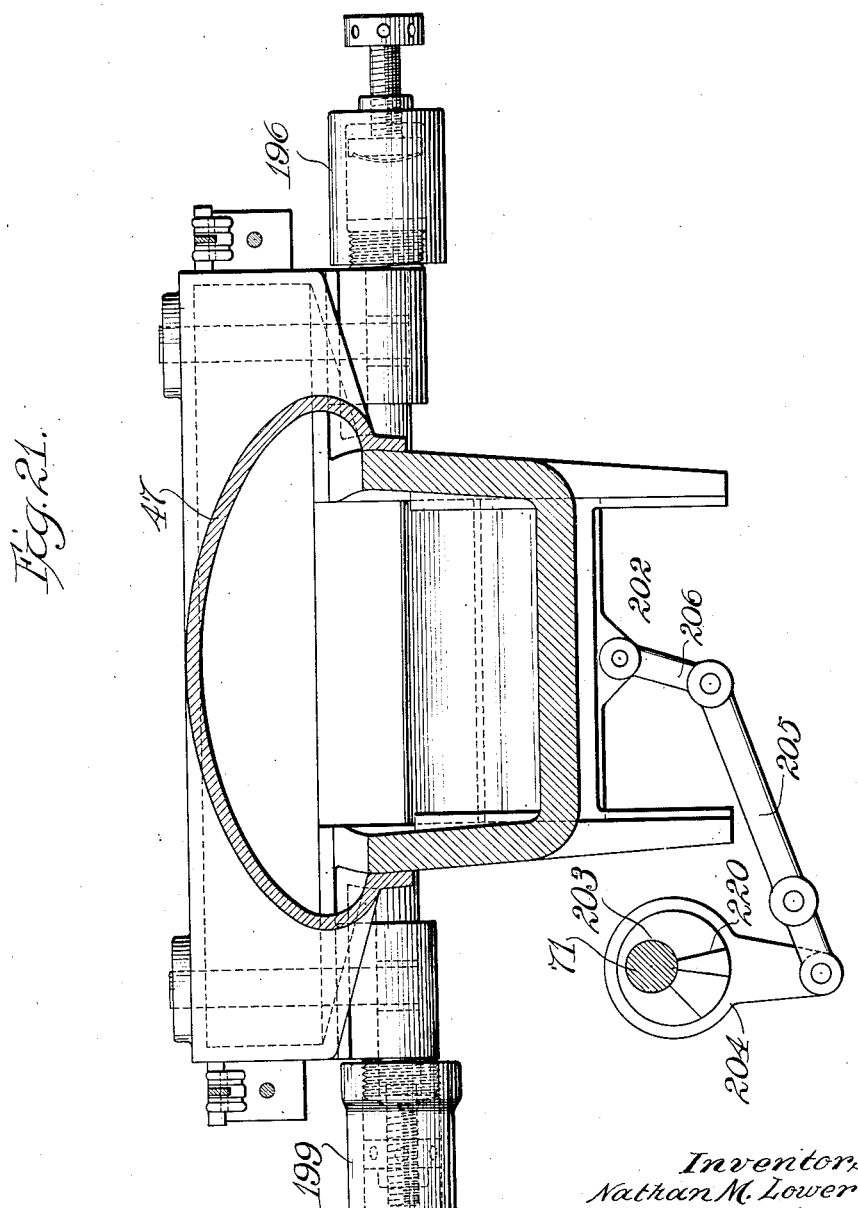

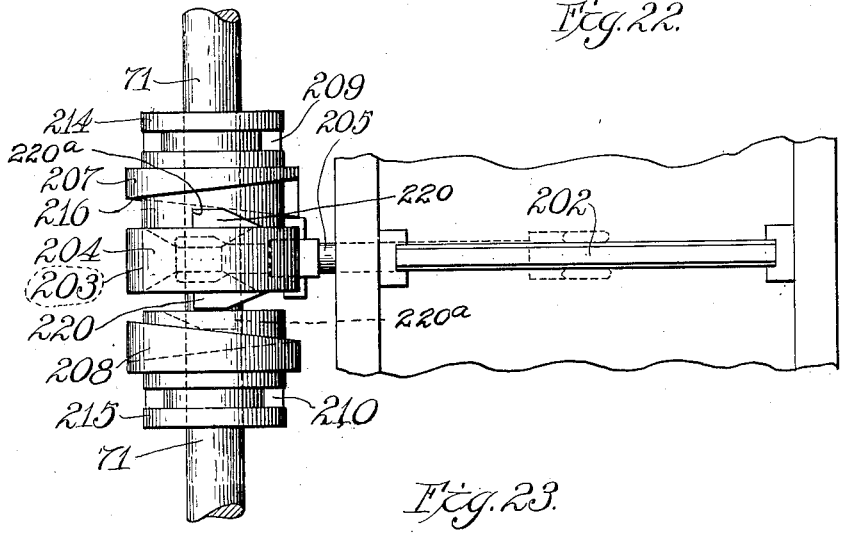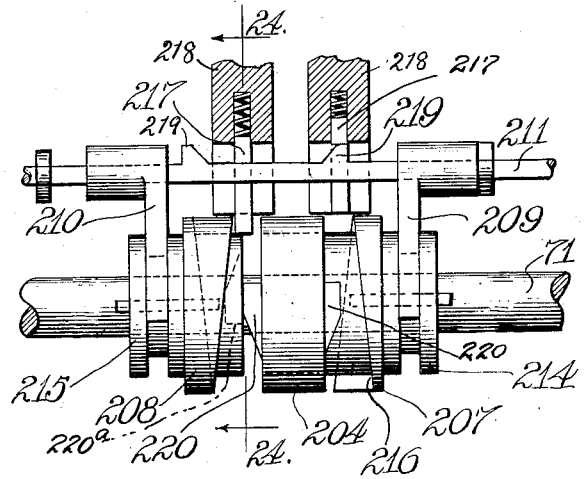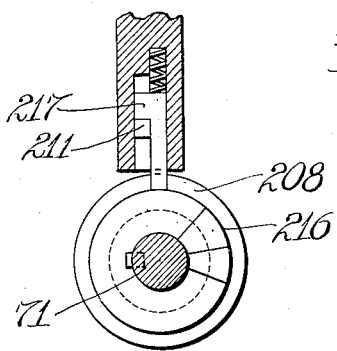

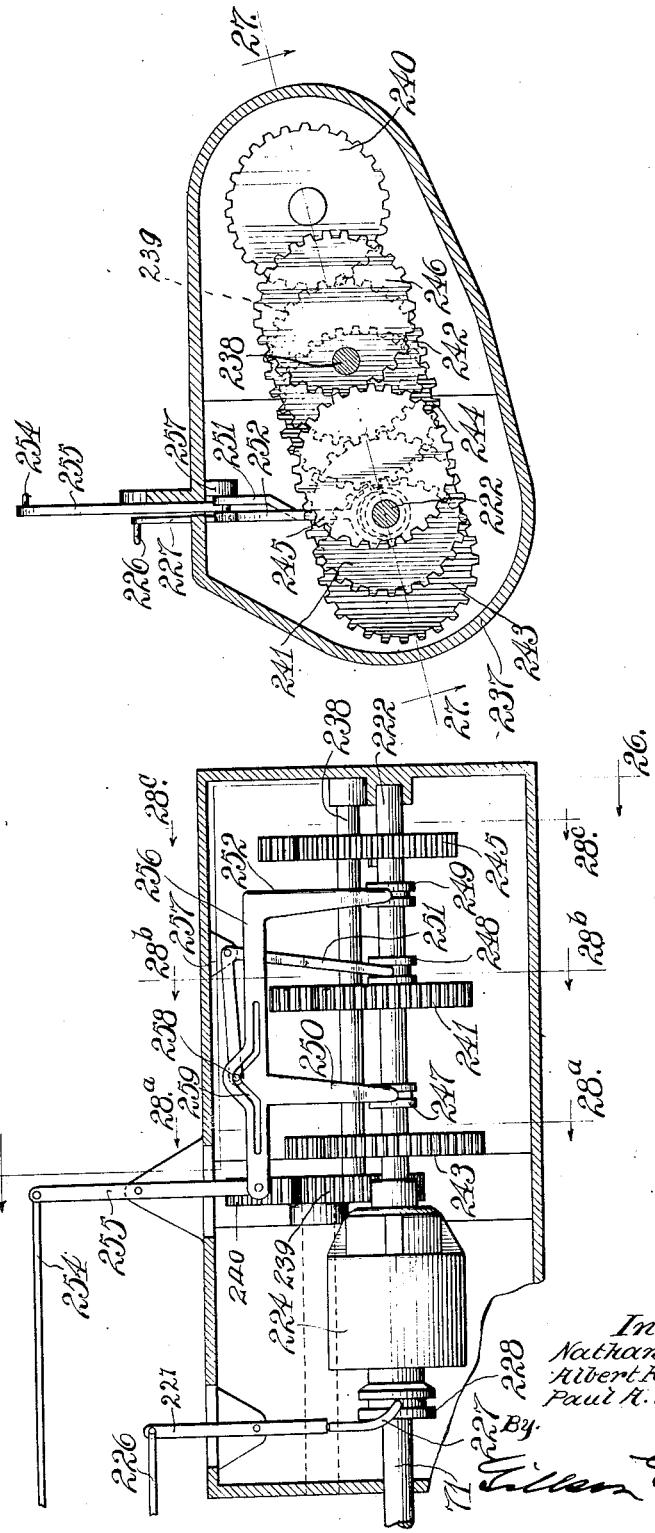

April 21, 1931. N. M. LOWER ET AL 1,801,561
LOCOMOTIVE STOKER
Filed June 10, 1922 20 Sheets-Sheet 16

Inventors:
Nathan M. Lower
Albert R. Chalker
Paul A. Ketchper
By
Gillson Gillson
Attys.

April 21, 1931. N. M. LOWER ET AL 1,801,561
LOCOMOTIVE STOKER
Filed June 10, 1922 20 Sheets-Sheet 17
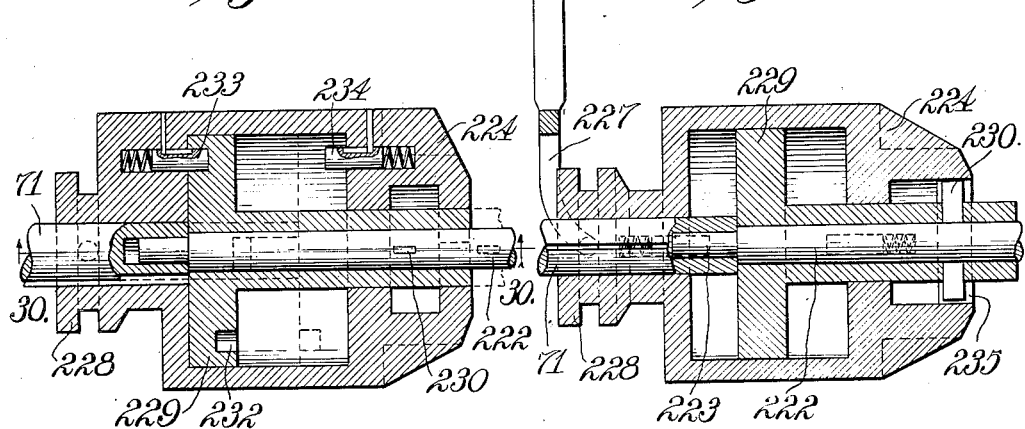
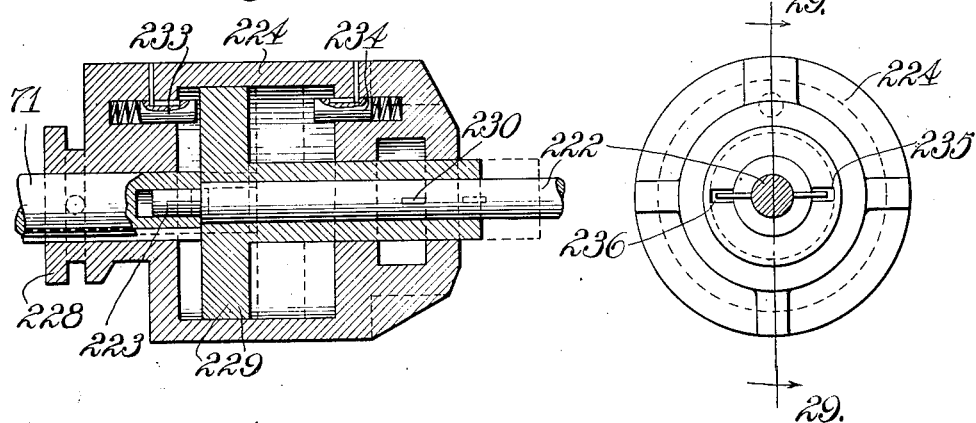
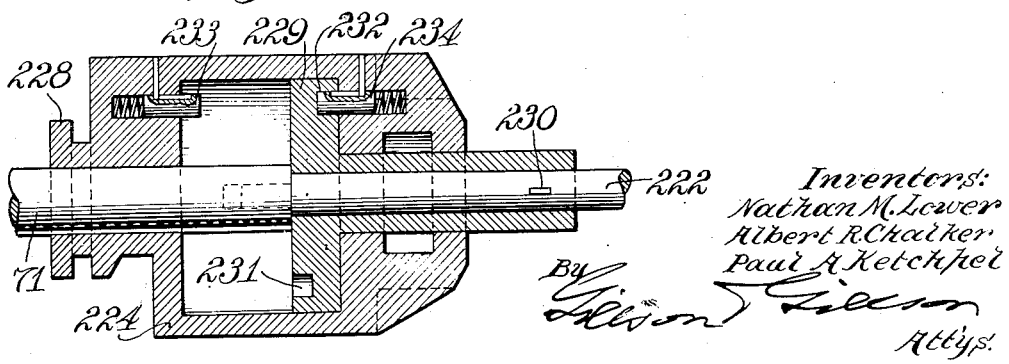

April 21, 1931.  N. M. LOWER ET AL  1,801,561
LOCOMOTIVE STOKER
Filed June 10, 1922   20 Sheets-Sheet 18
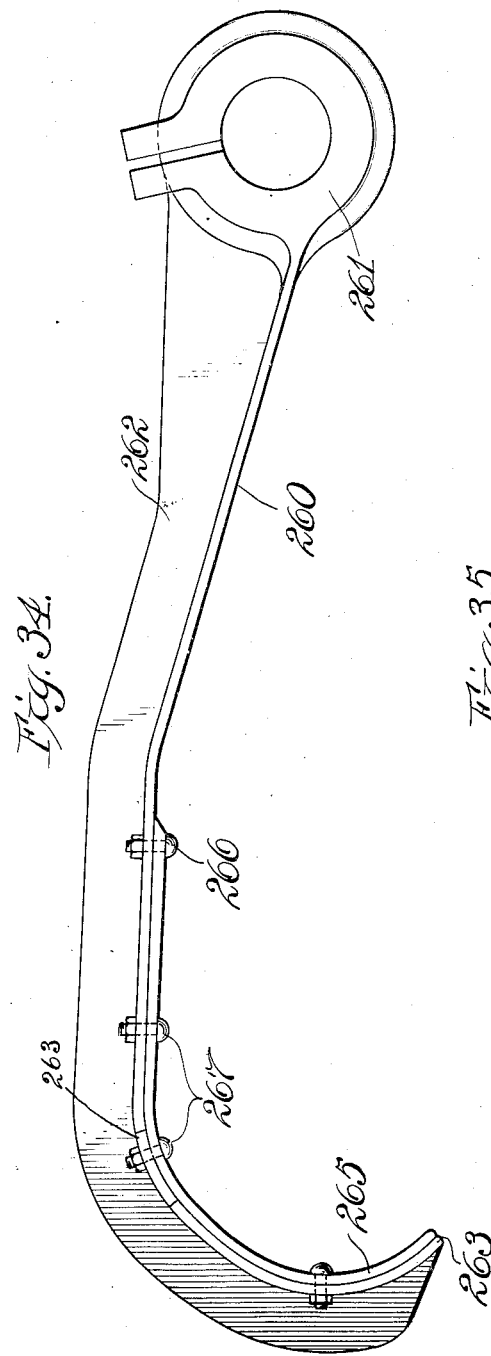
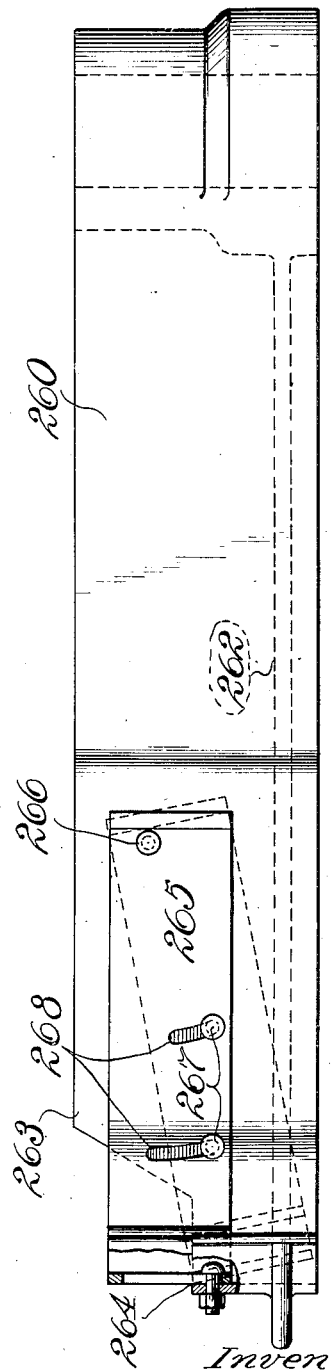
Inventors:
Nathan M Lower
Albert R Chalker
Paul A Ketcher
By Gillson & Gillson Attys

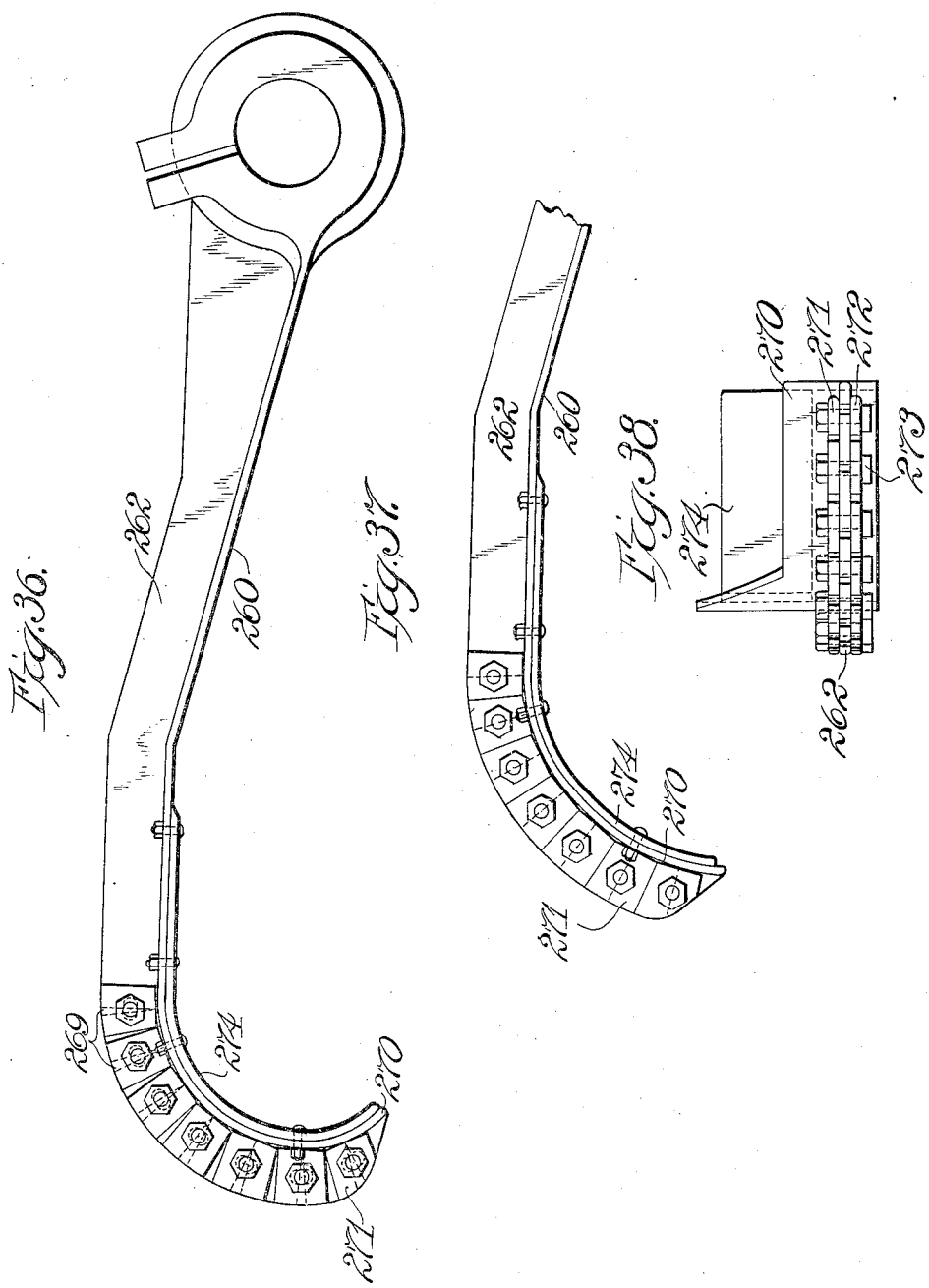

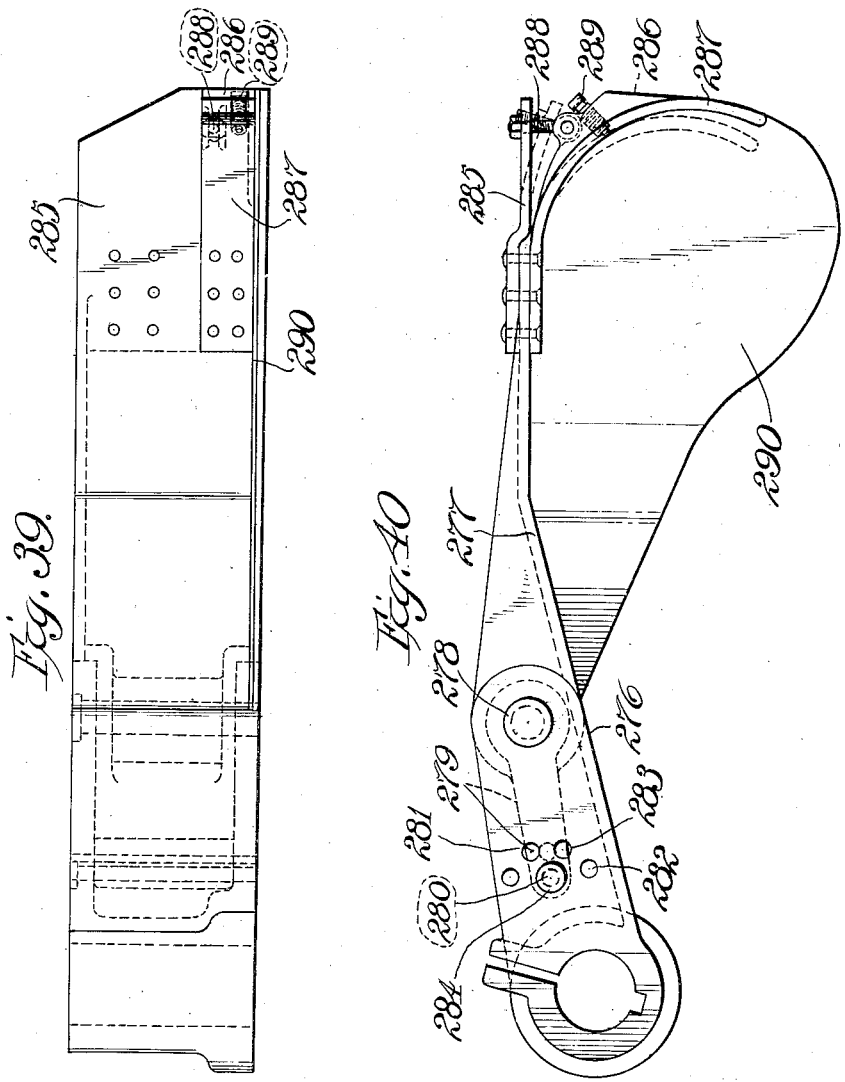

Patented Apr. 21, 1931

1,801,561

UNITED STATES PATENT OFFICE

NATHAN M. LOWER, ALBERT R. CHALKER, AND PAUL A. KETCHPEL, OF PITTSBURGH, PENNSYLVANIA, ASSIGNORS, BY MESNE ASSIGNMENTS, TO THE STANDARD STOKER COMPANY INC., OF NEW YORK, N. Y., A CORPORATION OF DELAWARE

LOCOMOTIVE STOKER

Application filed June 10, 1922. Serial No. 567,294.

The invention relates to mechanical stokers for furnaces, and as illustrated is especially adapted for the firing of locomotives.

The invention relates more specifically to stokers of the type in which the fuel is projected into the furnace by means of swinging vanes; and its objects are to provide improved means for actuating the vanes; for regulating the action of the vanes as to their frequency and order of operation, the speed of movement, and the length of stroke; to provide improved means for delivering fuel to the zone of operation of the vanes; and to control the delivery mechanism; to vary the size or quantity of each increment of fuel delivered to such zone, and the order of such delivery of greater and lesser increments.

Further objects accomplished by the invention will appear in connection with the description of the apparatus.

The invention consists of a structure, either as an entirety or as to various of its parts, as hereinafter described and as illustrated in the accompanying drawings, in which—

Fig. 1 is a detail central vertical longitudinal section of a locomotive and its tender, with the improved stoker mounted thereon and shown in side elevation;

Fig. 2 is a detail plan view of a locomotive, partly in section, and its tender, with the improved stoker applied thereto;

Fig. 3 is a detail plan view of the stoker mechanism, some parts being in section, portions being broken away, and the position of interior parts being indicated in dotted lines;

Fig. 4 is a detail vertical longitudinal section of a locomotive with the parts of the stoker applied thereto and shown mainly in side elevation, some of the parts being broken away;

Fig. 5 is a sectional view on the line 5—5 of Fig. 3, parts of the locomotive being shown;

Fig. 6 is a transverse vertical section of the stoker mechanism through the vane box, portions of the operating mechanism being shown in elevation;

Figure 12:
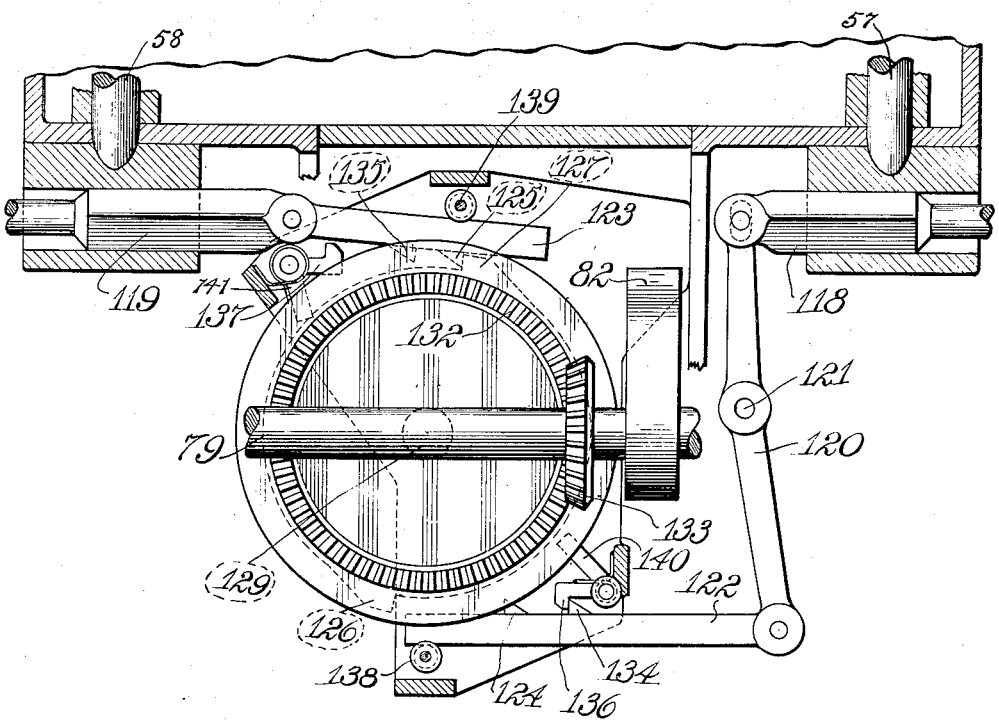

Figs. 7 and 8 are detail sectional views of the means for regulating the length of stroke of the fuel projecting vanes;

Fig. 9 is a detail, partly in elevation and partly in section, of the mechanism for regulating the elevator which raises the coal to the zone of action of the fuel projecting vanes;

Fig. 10 is a detail plan, partly in section, of the mechanism shown in Fig. 9;

Fig. 11 is a sectional detail on the line 11—11 of Fig. 9;

Fig. 12 is a detail transverse vertical section through the vane box and the elevator, and parts of the mechanism for regulating the action of the fuel projecting vanes;

Figure 13:
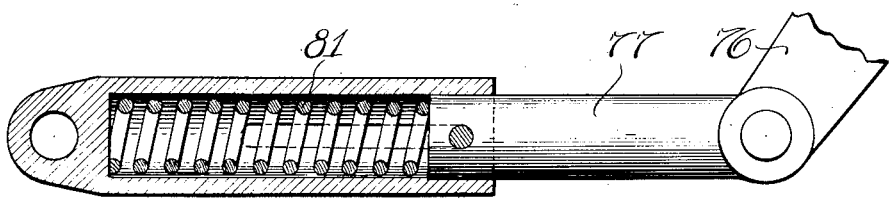

Fig. 13 is a detail of the crank arm for actuating the elevator loader and of an extensible link for transmitting power to such arm, with parts in section;

Fig. 14 is a vertical transverse section, some parts being shown in elevation and portions being broken away, of a part of the mechanism for regulating the action of the fuel projecting vanes;

Fig. 15 is a detail section on the line 15—15 of Fig. 14;

Fig. 16 is a view similar to Fig. 4 but showing the opposite side of the stoker mechanism;

Fig. 17 is a detail sectional view on the broken line 17—17 of Fig. 16;

Figs. 18, 19 and 20 are details, partly in elevation and partly in section, of mechanism shown in Fig. 17; Figs. 18 and 20 being taken on the lines 18—18 and 20—20, respectively, of Fig. 19 and Fig. 19, being an elevation of a detail as seen from the opposite side of the device from that shown in Fig. 17;

Fig. 21 is a transverse vertical section, partly in elevation, on the line 21—21 of Fig. 4, showing a modification;

Figs. 22 and 23 are a detail plan view and a detail side elevation, respectively, of mechanism shown in Fig. 21;

Fig. 24 is a detail sectional view on the line 24—24 of Fig. 23;

Fig. 25 is a detail vertical longitudinal section of mechanism for driving a fuel transferring screw;

Figure 27:
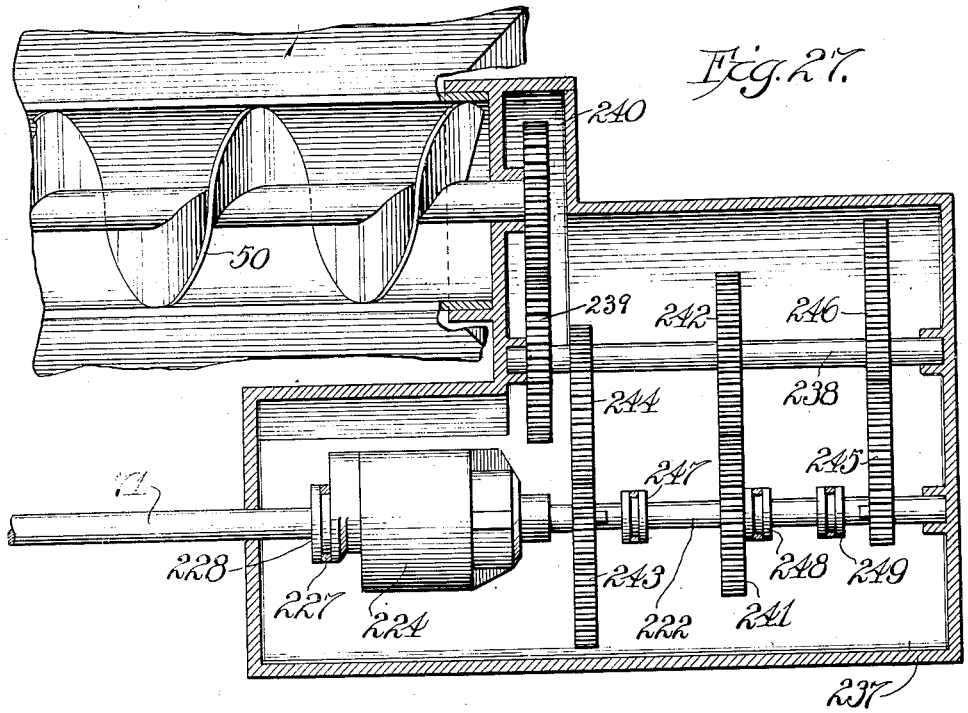
Figure 28:
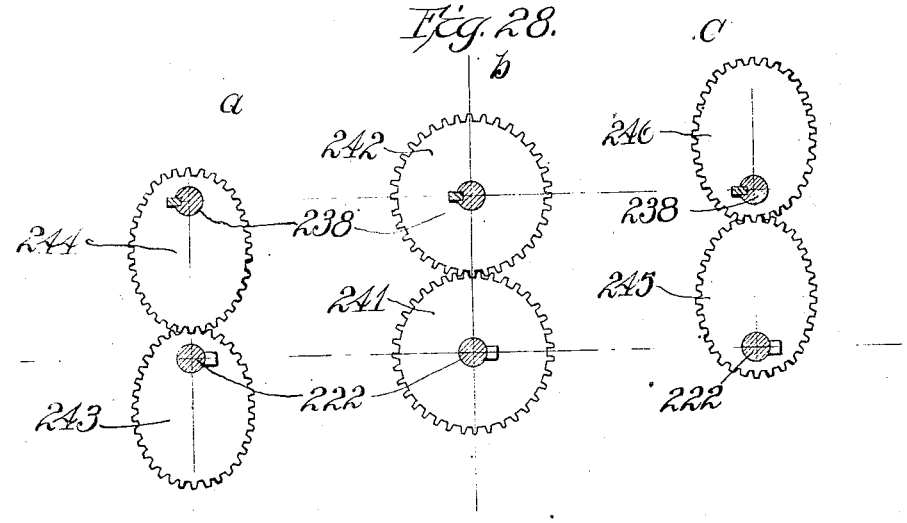

Fig. 26 is a sectional view on the broken line 26—26 of Fig. 25;

Fig. 27 is a detail sectional view on the line 27—27 of Fig. 26, and of the fuel transferring screw;

Fig. 28 is a series of diagrammatic views a, b and c, taken on the lines, respectively, 28ª—28ª, 28ᵇ—28ᵇ and 28ᶜ—28ᶜ of Fig. 25;

Figs. 29 to 33 are details of clutch mechanism shown in Figs. 25 and 27,—Fig. 32 being an end elevation thereof and Figs. 29, 31 and 33 being on the line 29—29 of Fig. 32, and Fig. 30 being on the line 30—30 of Fig. 29,—the parts being shown in different positions in these several views;

Fig. 34 is a plan view of one of the fuel projecting vanes used in the apparatus;

Fig. 35 is a front elevation of the same, some parts being broken away and parts being shown in section;

Fig. 36 is a plan view of a modified form of fuel projecting vane;

Fig. 37 is a detail plan view of the vane shown in Fig. 36, with portions in a different position of adjustment;

Fig. 38 is an end elevation of the vane shown in Fig. 36;

Fig. 39 is a rear elevation of a fuel projecting vane, showing a different modification; and Fig. 40 is a plan view of the vane shown in Fig. 39.

In its general organization the device comprises a trough 40, located below the floor 41 of the fuel bin of the locomotive tender 42, and leading forwardly as a conduit 43, which is connected, by means of a universal joint, shown as of the ball and socket type, at 44, to a conduit 45 similarly jointed at 46 to the rear end of a casing 47, which is carried by the back head 48 of the locomotive fire-box, the forward end of this casing being open and extending into the firing door opening 49 of the fire-box. In order that the casing 47 shall form a minimum obstruction to hand firing the locomotive through the firing door opening, the top wall of said casing is shortened and the forward edges of the side walls are inclined rearwardly as shown at 25 (see Figs. 1, 4, 5 and 16). Each closure or door 26 for the opening 49 terminates at its lower end in a rearward skirt or extension 27 which is adapted to engage the ends of said walls for closing said opening and for assisting in guiding the fuel therethrough during the operation of the stoker.

A screw conveyor 50, within the trough 40, leads forwardly within the conduit 43, and is connected, by means of a universal joint, with a screw conveyor 51 within the conduit 45, these screws carrying the fuel forward into the casing 47 and delivering it upon an oscillating elevator loader 52, which deposits it in separated charges upon the surface of an oscillating elevator 53, which in its upper position is in line with and forms a continuation of the floor 54 of the delivery end of the casing 47.

A pair of heads or elements which are adapted to move to and fro, i. e., reciprocate, are employed for impelling the fuel into the fire box. As shown, oscillating vanes 55 and 56 are employed for this purpose. They are pivotally mounted at 57, 58, within and one at each side of the casing 47, and near its forward end. These vanes in their retracted position extend backwardly along the side walls of the casing 47 and alternatively are swung forward through the open end of this casing, sweeping over the elevator 53 and the floor 54 and acting as impelling heads, discharging into the fire-box the increment of fuel which has been brought up by the elevator.

In the embodiment of the invention as illustrated in the drawings, each of the vanes 55, 56, is swung forwardly by the action of a motor, which may be in the form of a helical spring 59, 60, these springs being housed within casings 61, 62, each being connected with the vane with which it cooperates by means of a rod 63, 64, and chain 65, 66, attached to the pivot shafts 57, 58, which carry the vanes. Upon each of the rods 63, 64, there is fixed a head 67, 68, bearing upon the end of the spring with which it is associated.

The entire mechanism is driven by any suitable form of motor, preferably of the variable speed type, such a motor being conventionally shown at 69 and associated with the main drive shaft 70. A jointed shaft 71, driven from the shaft 70 by means of a pair of bevel gears 72, 73, leads backwardly under the tender and is connected by suitable gearing with the rear end of the shaft of the screw 50 for driving the same.

The elevator loader 52 (Fig. 5) takes the form of a plate fixed upon a shaft 74, journaled across the bottom of the casing 47, and near its rearward end, and is provided with a segmental skirt 75, which is in constant engagement with the forward margin of the casting 46 forming one element of the ball joint connection with the conduit 45. The shaft 74 is provided with a crank arm 76 (Fig. 4), connected by means of a spring-extended telescopic link 77 (Figs. 4 and 13), attached to a crank arm 78 fixed upon a constantly driven shaft 79. The relative length of the crank arms 76 and 78 is such that while the latter makes a complete revolution the former is caused to oscillate to give the loader the desired range of travel.

When the loader is in its retracted position, as shown in Fig. 5, fuel delivered from the conduit 45 falls upon it. As the loader swings upwardly it carries with it an increment of fuel and deposits it upon the elevator 53, the latter being then in its lower position. The skirt 75 prevents the escape of fuel below the loader as it makes its stroke, and also prevents any interference by the fuel with the loader as it descends.

Under some circumstances, as hereinafter described, the downward movement of the elevator is restricted for the purpose of reducing the load delivered to it, and in that case particles of fuel may be pinched between the ascending loader and the segmental skirt 80 depending from the rearward end of the elevator. When this occurs the spring 81 within the barrel of the link 77 is compressed and stalling of the machine or breakage of the parts is thus prevented.

The elevator 53 is raised by means of a sector-shaped cam 82 (Fig. 5), which wipes a wear plate 83 formed on the under face of the elevator. The cam 82 is fixed upon the shaft 79, which is driven from the shaft 70 by means of a sprocket chain 84 running on sprocket wheel 85 fixed upon the shaft 70, and a sprocket wheel 86 fixed upon the shaft 79. The angular relation of the crank arm 78 and cam 82 is such that the loader 52 and elevator 53 rise and fall alternately.

When the elevator is in its lower position, the fuel raised by the loader 52 is deposited upon its face, and when it is in elevated position, it is in the path of the vane 55 or 56 which makes the next advance stroke. In trimming the fire it is sometimes advisable to feed more heavily to one side of the firebox than to the other, and this may be accomplished by varying the loads deposited upon the elevator by limiting the downward travel of the latter in some of its strokes. Obviously if the elevator does not move down to bring its upper surface substantially in line with the hub of the loader, only a portion of the fuel raised by the latter will be deposited upon it. If the feed from the conduit 45 be constant it follows that the next succeeding load carried up to the elevator will be correspondingly heavy.

Figure 1:
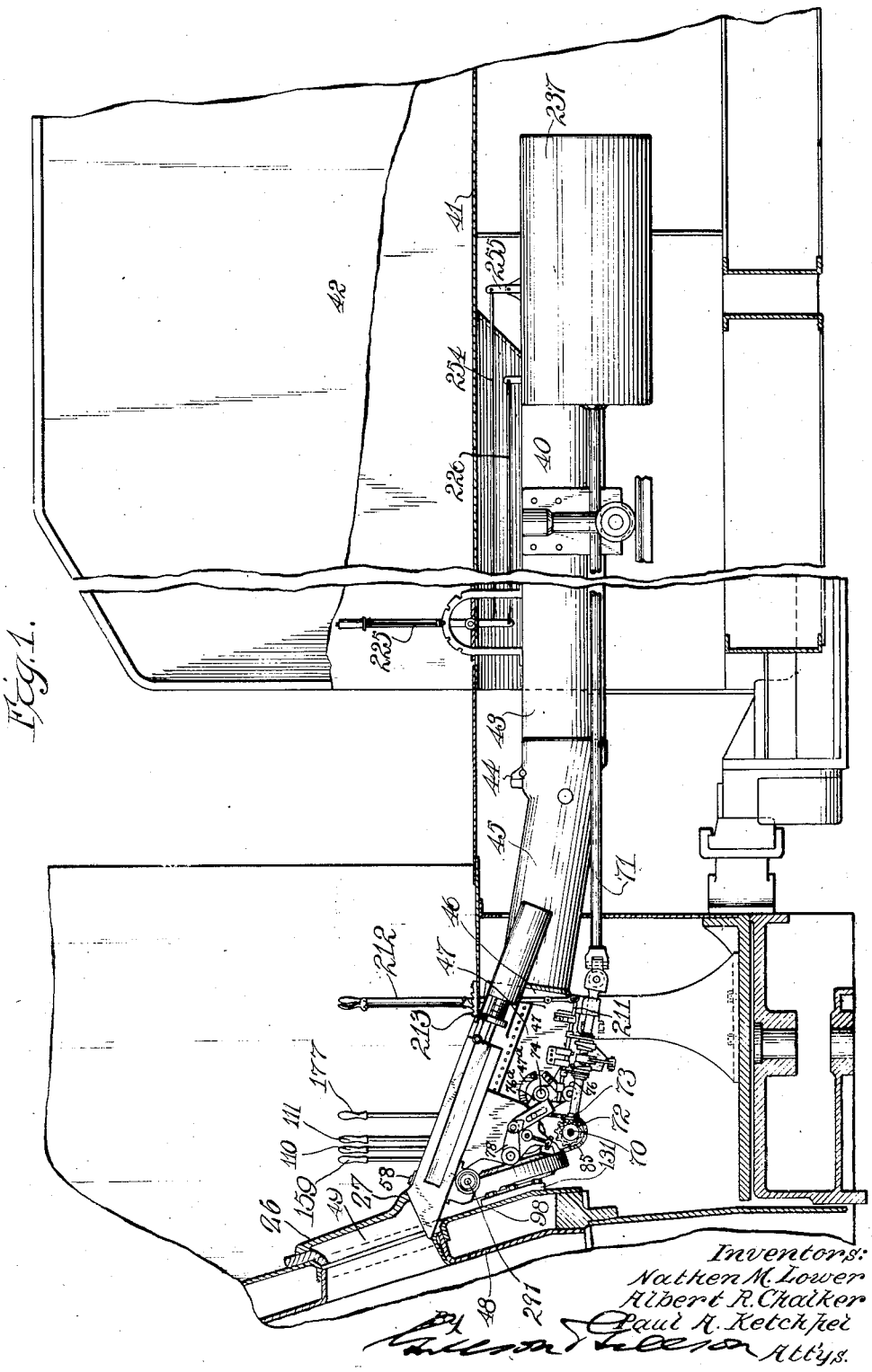
Figure 2:
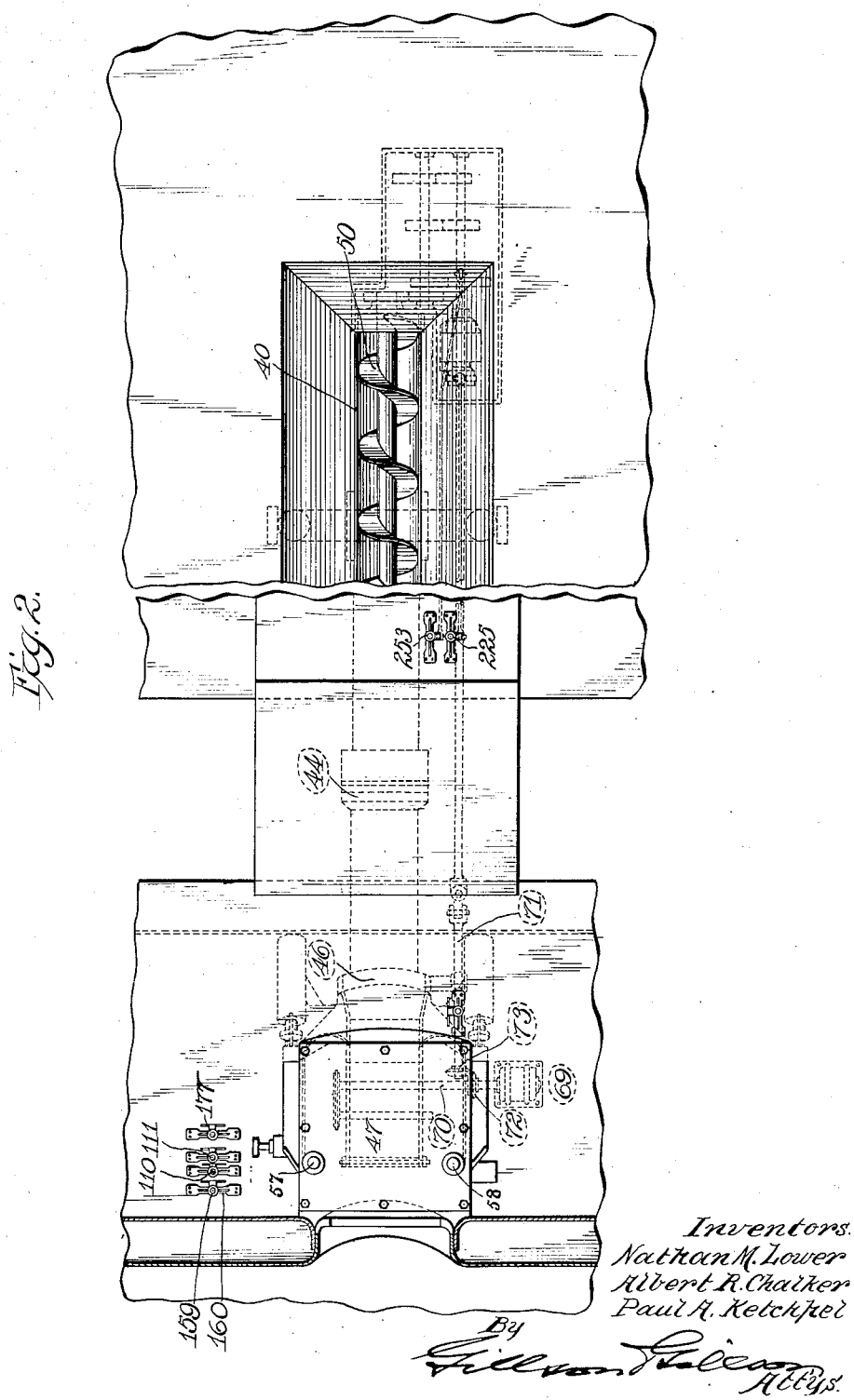

In Figs. 1 and 4 is shown a plate 47ª, secured to the casing 47, and a lever 76ª cast integral with the hub of the lever 76, which is keyed to the shaft 74. A spring-pressed pin 76ᵇ, carried by the lever 76ª, rides on the plate 47ª and engages grooves 47ᵇ near the end of the upward oscillation of the loader 52. This brake effect tends to hold the loader in an upright position.

Variations in the strokes of the elevator are secured by means of a pair of laterally adjustable sector-shaped cams 87, 88 (Figs. 6, 9, 10 and 11), slidably mounted on a shaft 89, driven by means of a pair of gears 90, 91, mounted, respectively, on the shafts 79 and 89, these gears being so proportioned that the shaft 89 makes but half as many revolutions as the shaft 79. The cams 87, 88, cooperate with a pair of stepped blocks 92, 93, secured to the lower face of the elevator 53. When it is desired that the elevator shall continuously make its full stroke, the cams 87, 88, are brought to the position shown in Fig. 6, both of them being out of line with the blocks 92, 93. The cams 87, 88, may be shifted, respectively, to the left or to the right, to bring them into line, the one with any of the three shoulders of the block 92 and the other with similar shoulders on the block 93, thereby limiting the downward travel of the elevator to a corresponding extent. The cams 87, 88, are so positioned upon the shaft 89 that alternately they are turned so as to engage the descending elevator, or one of the steps on the blocks 92, 93.

This arrangement for the limiting cams 87, 88, and stepped stop blocks 92, 93, provides for a wide range of variations in the delivery of the fuel into the fire-box. When the cams are in the position shown in Fig. 6, the elevator receives a full load at each stroke. By permitting one of the cams, as 88, to remain in the position shown and shifting the other, 87, to the left to engage the shorter step of the block 92, alternate elevator loads will be slightly varied. By shifting the cam 87 to engage the next step of the block 92 a greater variation of elevator loads will be effected, and by shifting it still farther to the left to bring it into engagement with the longer of the three shoulders of the block 92 an extreme variation will be effected. This shifting of the cam 87 will cause a delivery of the lighter loads uniformly to the vane 55, and the heavier loads to the vane 56.

By permitting the cam 87 to remain in the position shown in Fig. 6, and shifting the cam 88 to the right in a similar manner, a corresponding variation in elevator loads is secured, the lighter loads being uniformly delivered to the vane 56 and the heavier loads to the vane 55.

The cam 88 is fixed to a sleeve 94, slidably mounted upon and in splined engagement with the shaft 89. The cam 87 is carried by a sleeve 95, telescoping upon the sleeve 94 and having at its rear end a bushing 96, slidably fitting upon the shaft 89 and rigidly fastened to the sleeve 95. This sleeve is longitudinally slotted to form a plurality of segmental bars, as 97, which pass through and slide within complementary apertures in the cam 88. This interlocking of the cams causes them to rotate together, and turning movement is imparted from the shaft 89 by reason of the splined engagement of the sleeve 94 therewith.

Each of the sleeves 94, 95, is provided with an annular groove 98, 99, for engagement, respectively, by the shipper arms 100, 101. Each of these arms is carried by a hub, as shown at 102, 103, sliding upon a rod 104, carried by the frame members 105, 106, which support the shaft 89, a helical spring 107, coiled about the rod, reacting between the two hubs to hold them in their extreme outward positions, and consequently bring the two cams 87, 88, together, as shown in Figs. 6, 9 and 10. Link rods 108, 109, connect the hubs 102, 103, respectively, with controlling levers 110, 111, which project upwardly through the cab floor and are provided with the usual quadrant and pawl locking mechanism.

Figure 3:
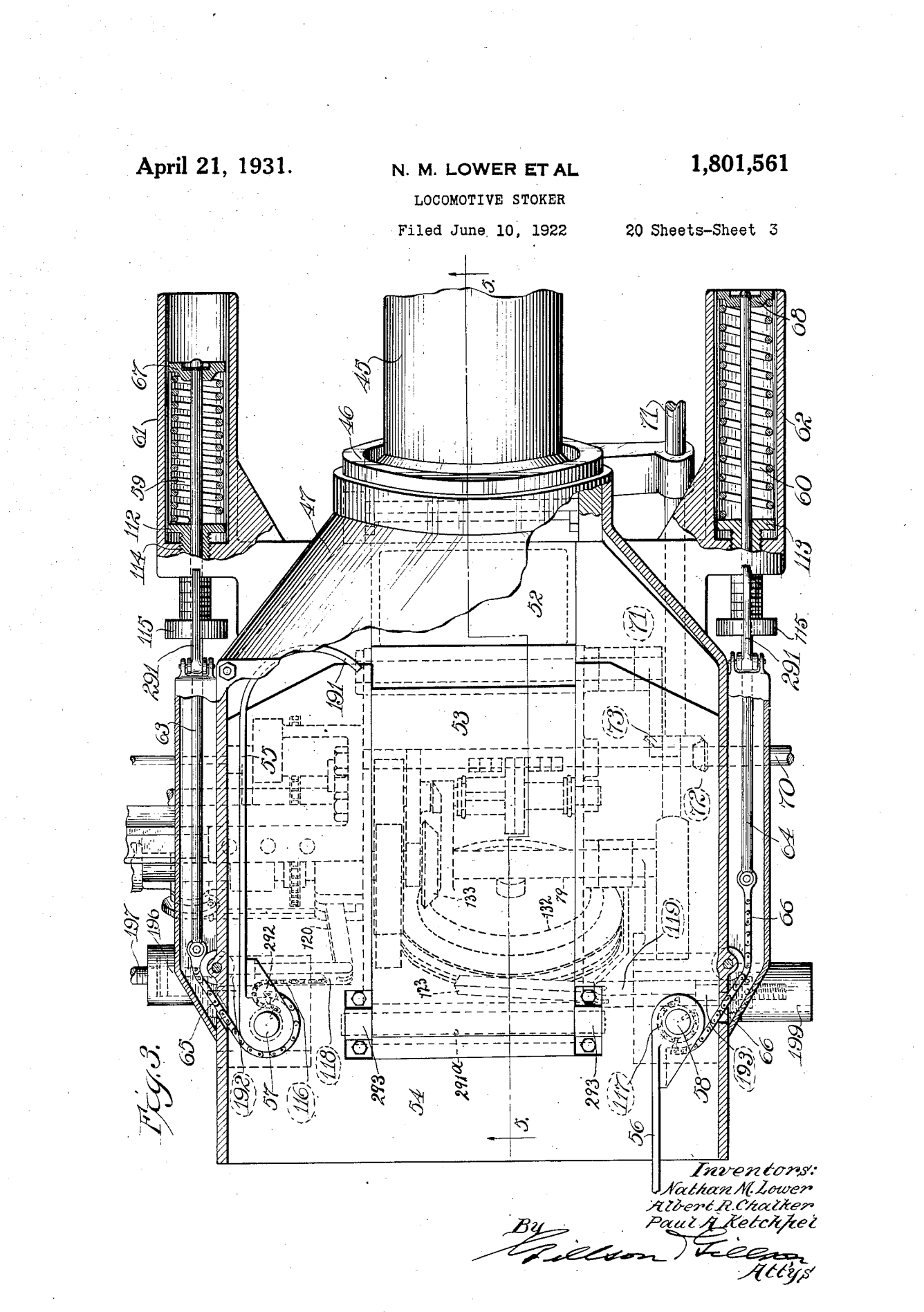

Within the spring casings 61, 62 (Fig. 3), and at their inner ends, there are provided spring seats 112, 113, carried by stems, as 114, which are threaded in apertures in the end walls of the casings and provided at their outer ends with knurled heads 115, by which they may be turned for the purpose of shifting the spring seats within the casings to vary the tension of the springs 59, 60. At 291, 291, there is shown a pair of latch bars for engaging notches in the heads 115 to prevent accidental shifting of the spring seats. When the spring seats are drawn backwardly against the ends of the casing the spring tension is reduced to the minimum, and consequently as the springs expand they swing the vanes 55, 56, forwardly at their minimum velocity. As the spring seats are advanced within the casing the tension of the springs is increased, and consequently the velocity with which the vanes are advanced.

As the vanes swing forwardly they wind upon their shafts 57, 58, chains 116, 117, which are secured, respectively, to plunger rods 118, 119. The plunger rod 118 is connected (Fig. 12) to a lever 120, fulcrumed at 121 on a fixed support, the opposite end of the lever being connected to an actuating bar 122. The plunger rod 119 is pivotally attached directly to a similar actuating bar 123. The chain 116, attached to the actuating bar on plunger rod 118, is turned over an idler pulley 292 in order to reverse its direction.

Each of the actuating bars 122, 123, is provided with a laterally projecting shoulder 124, 125, which, when the vanes 55, 56, are advanced, extend into the path of radially projecting shoulders 126, 127, formed on the periphery of a wheel 128 (Figs. 5, 14, 15), mounted upon a stub shaft 129, journaled in the frame member 130, which is attached to the pad 131 bolted to the back head 48 of the fire-box. A bevel gear 132, fixed upon the shaft 129, meshes with a bevel gear 133 of one-half the size, which is mounted on the shaft 79.

Each of the actuating bars 122, 123, is provided with an additional laterally projecting shoulder 134, 135, adapted to be engaged, upon the shifting of the bar by the wheel 128, by a spring-advanced retaining pawl 136, 137. The actuating bars 122, 123, are held against lateral movement away from the wheel 128 by rollers 138, 139, as shown in Fig. 12.

Each of the pawls 136, 137, is provided with an arm 140, 141, which, when the pawl is in its normal position, projects into the path of tripping plungers 142, 143 (when the latter are advanced), carried upon the disc face of the wheel 128, and having radial movement with reference thereto.

When, as in the normal operation of the stoker, the vanes 55, 56, are alternately advanced, the tripping plunger 142 only is in service, the plunger 143 being retracted, as shown in the full line positions in Fig. 14, where the actuating plunger 123 has just been released and the vane 56 has made an advance stroke. With the parts positioned as in this figure, the shoulder 126 of the wheel 128 is out of service. As the shoulder 127 moves to the right it engages the shoulder 125 of the actuating bar 123, shifting this bar to the right, permitting the pawl 137, which will now have been released from the tripping plunger 142, to again engage the shoulder 135. By this action the vane with which the actuating bar 123 is associated is withdrawn and held until the wheel 128 makes a complete revolution. When the wheel 128 has made a half turn from the position of Fig. 14, the tripping plunger 142 engages the arm 140 of the pawl 136, thus releasing the actuating bar 122 and permitting the forward stroke of the vane with which it is associated, this vane being immediately retracted by the engagement of the shoulder 127 with the shoulder 124 of the actuating bar 122, returning this bar to the position shown in Fig. 14.

Each of the tripping plungers 142, 143, is slidably housed within a casing 144, 145, secured to the disc face of the wheel 128, and is urged inwardly by a spring 146, 147, reacting between a shoulder 148, 149, formed on the plunger, and an end wall of the casing. The inner ends of the tripping plungers 142, 143, are held in constant engagement, respectively, with the circumferential faces of a pair of cams 150, 151, rigidly secured together and to a gear wheel 152, and are loosely mounted upon the hub for the shaft 129. These cams are shifted and held in adjusted positions by means of a rack gear 153 (Figs. 14 and 17), meshing with the gear 152 and carried by a roller 154 supported on the frame member 130. The cam 150 is circular except that it has one flattened side, as shown at 155. The cam 151 is smaller and is also substantially circular but has a bulge or swell at one side, as shown at 156. As a result of this configuration of the cams the tripping plunger 142 is held in advanced position throughout all of its cycle of movement, except while passing the depression 155, while the tripping plunger 143 is normally in retracted position and is advanced only as it passes the swell or bulge 156.

With the parts in the position shown in Fig. 14, the tripping plunger 142 is advanced for engagement with the arms 140, 141, of both of the retaining pawls 136, 137, thereby effecting the continuous alternate operation of the vanes 55, 56. The retraction of this tripping plunger as it passes the depression 155 of the cam occurs intermediate of the pawls and is without effect. The tripping plunger 143 is, with the parts in the position of Fig. 14, constantly retracted except as it passes the swell 156 of the cam, with which it cooperates, and as this is intermediate of the pawls its temporary extension is without effect.

Means are also provided for operating the vanes 55 and 56 alternatively in order that the fire may be trimmed at one side of the firebox to the exclusion of the other, as may be desired. Any suitable mechanism may be provided for this purpose. As shown on the drawings, the parts are so constructed that the shifting of the rack bar 153 to the right, from the position of Fig. 14, to turn the cams to the left through 90 degrees, brings the depression 155 of the cam 150 opposite the tripping arm 141 of the pawl 137, thereby throwing the vane 56 out of action. The swell 156 of the cam 151 is, by the same movement, brought opposite the arm 140 of the pawl 136, thus causing the extension of the tripping plunger 143 in time to release this pawl, the plunger 142 continuing to engage the arm 140. With the cams thus disposed the vane 55 is actuated twice on each turn of the shaft 79, while the vane 56 remains idle and the fuel is all thrown to the right side of the firebox.

A shifting of the rack bar 153 to the left from the position of Fig. 14, to turn the cams 150, 151, to the right through 90 degrees, will bring the swell 156 of the cam 151 in position to advance the plunger 143 to engage the arm 141, while the depression 155 of the cam 150 will be so positioned as to permit the retraction of the plunger 142 as it passes the arm 140. As a consequence the pawl 137 will be actuated twice during each revolution of the wheel 128, while the pawl 136 will remain idle and all of the fuel will be thrown to the left of the fire-box by the vane 56.

When but one of the vanes is active and is being operated at twice the normal speed, both of the shoulders 126, 127, cooperate with the actuating bar 122 or 123. When the vanes are operated alternately the shoulder 126 is out of service, as it passes the shoulders 124 and 125, while the actuating bars are in retracted position.

The rack bar 153 is connected with a yoke 157, slidably mounted on the shaft 79 and connected, by means of a link 158, with a hand lever 159 projecting upwardly through the floor of the cab and having associated with it the usual quadrant and latch locking mechanism, as shown at 160.

As thus far described the fire may be trimmed by throwing one of the vanes out of service and operating the other at double the speed, thus entirely depriving one side of the fire-box of fuel and delivering the entire supply to the other side thereof.

Unless the fuel bed has become very uneven it is desirable to merely vary the quantity of fuel delivered to the two sides of the fire-box, and provision is made for varying the order of the strokes of the vanes. For this purpose mechanism shown in Figs. 16 to 20 is provided. This mechanism is adapted to reciprocate the rack bar 153 in such a manner that one of the vanes is caused to vary its operation relatively to the other.

The rack bar 153 is connected to the yoke 157 through the medium of a crank wheel 161, mounted on a stub-shaft 162 carried by the yoke, and with which is also mounted a bevel gear 163, which meshes with a bevel pinion 164 slidably mounted on and rotative with a shaft 165, the pinion being held in constant engagement with the gear 163 by a collar 166, slidably mounted on the shaft 165 and rigidly connected with one of the hubs of the yoke 157.

The shaft 165 is journaled in the hub 169 carried by the frame 170 (See Fig. 17) and is rotated by means of the gear wheel 167 through the medium of the clutch 171 splined upon said shaft. The gear 167 is driven by a pinion 172, carried by a stub shaft 173 mounted in the hub 169, the pinion being fixed to a sprocket wheel 174, which is engaged by the sprocket chain 84 which is driven directly from the power shaft 70.

The ratio between the gears 172 and 167, and between the pinion 164 and gear 163, is as two to one, with the result that the crank wheel 161 is rotated at one-fourth the speed of the sprocket wheel 174.

When it is desired to operate the vane 55 above its normal timing for three strokes and then give the vane 56 a single stroke, the yoke 157 is shifted to the right from the position shown in Fig. 17, by means of the hand lever 159, and locked in that position by the quadrant and latch mechanism 160, and the clutch 171 is then engaged with the gear 167 by the rod 176. By this shifting of the yoke 157 the cam 150 is turned to bring its depression 155 opposite the pawl arm 141, and the swell 156 of the cam 151 is brought opposite the pawl arm 140. Both of the tripping plungers 142, 143, will consequently, cooperate with the pawl arm 140, while neither will engage the arm 141. The crank wheel 161 will make a half revolution while the wheel 128 is making a complete revolution. When the wheel 161 has turned through 180 degrees, the rack bar 153 will be returned to the position shown in Fig. 17, and the tripping plunger 142 will again engage the pawl arm 140, while the plunger 143 will pass the pawl arm 141. The pawl arm 141 will, however, be engaged by the plunger 142 at the next half turn of the wheel 128, thus giving the vane 56 one stroke, the vane 55 remaining idle because of the retraction of the plunger 143. By the time the plunger 142 again approaches the pawl arm 140 the crank wheel 161 will have completed a revolution, shifting the rack bar 153 to the right and turning the cams 150, 151, to the positions which had been given them by the manual shifting of the yoke 157, and a new cycle of vane stroke of three to one will commence.

Should it be desired to feed heavily to the left side of the fire-box and light to the right side, the yoke 157 is manually shifted to the left, from the position of Fig. 17, with the result that the pawl arm 141 is engaged three times in succession by the two tripping plungers and the pawl arm 140 is then engaged once by the plungers 142, whereupon a new cycle of three vane strokes to one is commenced.

The clutch 171 is shifted into engagement with the gear wheel 167 by means of a shipper yoke 175 (Fig. 19), connected by means of a rod 176 with a lever 177, projecting upwardly through the cab floor, the connection with this lever being of the same form as of the rod 158 with the lever 159. It being desirable that the crank wheel 161 will always be thrown out of action when the crank is in the position shown in Fig. 17, provision is made for automatically disengaging the clutch 171, the shipper yoke 175 having no clutch-releasing function. To this end the clutch 171 is provided with a spiral cam flange 178, with which cooperates a spring-advanced plunger 179, so positioned that it may ride upon a portion of the periphery of this cam and will drop into engagement with the face of the cam as the latter is revolved, thereby causing the movement of the cam and the clutch member to the right from the engaging position shown in Fig. 19. The plunger 179 is provided with a lateral shoulder 180, which rides upon the rod 176 and is engaged by a cam shoulder 181 formed thereon, and thus raised out of engagement with the cam 178 as the rod 176 is thrust forward for effecting the engagement of the clutch 171.

To prevent the shifting of the rod 176 in either direction except when the crank wheel 161 is in or is approaching the position shown in Fig. 17, a revoluble stop 182 is interposed in its path. This stop is in the form of a segment extending through approximately 200 degrees and pivoted at one end to the disc face of an internal gear 183, loosely mounted on the hub 169, the free end of the segment 182 being urged outwardly by a spring 184, carried by the gear 183, the segment entering a slot in the frame member 185, within which the rod 176 plays, and the plunger 179 is housed. When in its extreme outer position the segment 182 crosses the path of the rod 176, the latter being retracted, and when this rod is advanced enters a lateral recess in the rod, as shown at 186.

The gear 183 is mounted loosely on the hub 169. A pair of spur pinions 187, 188, mesh with the internal gear 183, and with a spur gear 189, fixed upon the shaft 168. Each of the pinions 187, 188, is mounted upon a stub shaft, as 190, which is secured in the hub 169. This train of gears is so proportioned that the internal gear 183 is driven at one-half the speed of the shaft 168. Inasmuch as the gear 167 makes two revolutions while the crank wheel 161 turns once, the angular relation of the segment 182 to the cam 178 is such that it prevents the withdrawal of the rod 176 until the cam 178 has but one turn to make in order to bring the crank on the wheel 161 into the position shown in Fig. 17.

Each of the vanes 55, 56, curves forwardly at its free end to form a hook 191, which may be varied in length and curvature to meet the requirements of the particular fire-box with which the stoker is associated. As the vane swings forwardly at high velocity the coal which is advanced by it tends, under the influence of centrifugal force, to move toward its outer end. When the vane makes a complete forward stroke, reaching the position of the vane 56 in Fig. 3, some of the fuel will be retained within the hook 191 to the end of the stroke, and then will be deposited in the back corner and along the back end of the fire-box.

In trimming the fire it is sometimes necessary to increase the amount of fuel thrown to the forward end of the fire-box and decrease delivery to the rearward end of the grate. To secure this result provision is made for shortening the advance stroke of the vanes. The outer ends of the plunger rods 118, 119 (see Figs. 7 and 8), are prolonged, as shown at 192, 193, and an adjustable head, as 194, 195, is provided for limiting their movement as the vane advances.

In the case of the vane 55 the plunger rod 118 moves outwardly on the advance stroke, and the adjustable head 194, cooperating therewith, is housed within a casing 196 secured to the side wall of the casing 47 and is carried by a screw rod 197, setting through the outer end of the casing and controlled by means of a head 198.

In the case of the vane 56 the plunger rod 119 moves inwardly on the advance stroke, and the adjustable head 195 is in the form of a nut threaded upon its outer end and covered by a removable casing 199 secured to the side wall of the casing 47. A bowed spring plate 200, attached to the head 194, and a similar plate 201, seated against the wall of the casing 47, receive, respectively, the impact of the rod 192 and the head 195, these plates serving as yielding or cushioning stops. When the adjustable heads 194, 195, are in retracted position the vanes make a full stroke, swinging through approximately 150 degrees. By setting up these heads the limit of advance movement of the vanes is correspondingly limited, thereby reducing the amount of coal that is carried into the back end of the fire-box and increasing the amount that is projected forwardly.

Provision is made for feeding alternately heavy and light loads to the elevator 53 by interrupting the flow of the coal from the conduit 45 to the loader 52. To this end a slide gate 202 is mounted within the base of the casting 46 and reciprocates between the end of the screw 51 and the loader, being operated at one-half the speed of the elevator 53.

With the parts in the position shown in Fig. 5 the gate 202 is at the end of its upstroke and will obstruct the flow of fuel to the loader 52, and hence cause the delivery of a light load upon the elevator after its next stroke. When the elevator again reaches the end of its upstroke the gate 202 will be at the end of its downstroke and will permit the delivery of a full charge to the loader. The gate may be timed in its movement to supply the varying loads to the vanes 55, 56, alternatively, thereby providing for feeding heavily to either the right or left side of the fire-box without varying the order of the strokes of the vanes.

The gate 202 is driven from the shaft 71 by means of an eccentric 203 (see Figs. 4 and 21 to 24) mounted thereon and having its strap 204 attached to one end of a lever 205, fulcrumed on a fixed pivot, the other end of the lever being connected to the gate by means of a link 206. The two arms of the lever 205 are so proportioned as to give the gate the desired range of travel.

The eccentric 203 is loose upon the shaft 71, but may be secured thereto by a pair of clutch members 207, 208, splined upon the shaft and advanced alternatively into engagement with the eccentric by means of a pair of shipper yokes 209, 210, carried by a slide rod 211 and advanced by collars thereon. The rod 211 is controlled by a hand lever 212, which projects forwardly through the cab floor, and has associated with it pawl and segment locking means as shown at 213 (Fig. 1). The yokes 209, 210, have no retractive action upon the clutch elements but ride upon a pair of sleeves 214, 215, which bear, respectively, on the outer faces of the clutches.

It is important that the gate 202 shall be thrown out of action when it is in its lowest position, and automatic means is therefore provided for releasing the clutches. Each of the clutches, as 208, is provided with a cam face spiral in form, as shown at 216. A spring-advanced plunger 217, housed in a block 218 through which the rod 211 reciprocates, rides upon the wider portion of the peripheral face of the clutch member 208, and as the latter turns to bring its widened portion beyond the plunger the latter drops into engagement with the cam face and further rotative movement of the clutch cams it backwardly out of engagement with the eccentric, and the cam face is so disposed angularly upon the shaft 71 that this release occurs when the gate is at the end of its downstroke.

The mechanism for releasing the clutch 207 is of the same description. The spring plungers, as 217, are raised out of engagement with the advancing clutch member by means of lugs, as 219, each having an inclined face for engaging and camming upwardly a shoulder on the plunger. Two clutches are provided in order that the strokes of the gate 202 may be timed with reference to either of the vanes 55, 56. The teeth, as 220, formed on the opposite faces of the eccentric 203, are so positioned as to be engaged by the shoulders 220a of the clutch members only when the gate is at its lowest position, that upon one side of the eccentric causing the gate to advance to obstruct the delivery of coal to one of the vanes, and that upon the other to obstruct such delivery to the other vane. There is only one shoulder 220a on each clutch member. The shoulders are arranged 180° apart. The shoulder shown in full lines in Figs. 22 and 23 is on the near side of the shaft 71, while that on the far side is shown in dotted lines.

The screw 51 is desirably provided at its delivery end with a prolongation of its flight to a greater diameter, forming what may be called a beak 221 (Fig. 5), which will push the coal forwardly beyond the end of the conduit 45 and onto the loader 52, the gate 202 being inactive. The conduit 45 is of such size that normally it is but approximately half filled with the stream of advancing fuel. The parts are so relatively positioned that when the loader 52 is in retracted position, as shown in Fig. 5, the beak 221 is moving downwardly and just entering the stream of fuel. The beak 221 continues to turn, reaching the lowest point in its cycle as the loader finishes its upstroke, and emerges from the fuel as the loader completes its next downward stroke. In the meantime this beak will have delivered a mass of coal between the end of the conduit and the skirt 75, and this mass will fall over onto the loader, which will make its next complete stroke while the beak is traveling through the upper half of its cycle. As the parts are thus relatively positioned the successive loads carried up to the elevator are approximately uniform.

By shifting the relative position of the screw and loader so that when the latter is down the beak 221 is either at the bottom or the top of the conduit, the successive loads carried up to the elevator are alternately heavy and light, with the result that the firebox is fed more heavily at one side than at the other. By a complete reversal of position of the screw there is a reversal in the order of heavy and light loads, with the result that the heavy firing is to the opposite side of the fire-box.

Provision is made for thus shifting the position of the screw in the conduit relatively to the movements of the loader, by dividing the shaft 71 into two sections (Figs. 25 to 33), its rearward section 222 having a loose mortise and tenon connection with the forward section, as shown at 223, and at its opposite end journaled in the wall of a casing 237. The joint of the two shaft sections is inclosed within a slidable clutch box 224, controlled by a lever 225 suitably provided with a quadrant and latch locking mechanism and projecting upwardly through the floor of the tender (Fig. 1), a link rod 226 connecting the lower end of the lever with a shipper yoke 227, engaging a collar 228 secured to the box. Within the box 224 there is fitted a disc 229, keyed to the shaft section 222, as shown at 230. This disc is provided in its opposite faces with a pair of pockets 231, 232, which are diametrically disposed as shown in Figs. 29 and 33, each of which cooperates with a spring-advanced dog 233, 234, housed, respectively, in the end walls of the box 224. The key 230 which secures the stem of the disc 229 to the shaft section 222, projects at both ends beyond the surface of the stem and enters slots 235, 236, in the end wall of a rearward extension of the box 224, these slots being positioned 90 degrees from the dogs 233, 234.

When the clutch box 224 is shifted to its central position, as shown in Fig. 30, the ends of the key 230 are locked within the slots 235, 236, and thus lock the two shaft sections together, and at this time the screw 51 will be in the position shown in Fig. 5. By shifting the clutch box to either of its extreme positions, as shown in Figs. 29 and 33, one of the dogs 233, 234, will enter one of the recesses 231, 232, and the screw will then be shifted from the position of Fig. 5 through 90 degrees either to the right or to the left. This clutch arrangement also provides for stopping the screw by moving the clutch box to neutral positions, as shown by solid lines and dotted lines in Fig. 31.

Provision is made for varying the alternate loads delivered to the elevator, in order that the feed to the firebox may be heavier upon one side than upon the other, by imparting a variable speed to the transferring screws 50 and 51. This is accomplished by interposing a set of variable speed gears between the shaft 222 and the shaft of the screw 50, as shown in Figs. 25 to 28, such gears being inclosed within a box 237 within which the shaft 71 and its extension 222 are journaled. A countershaft 238, journaled in the box 237, carries a gear 239, meshing with a gear 240 of the same size, fixed upon the rear end of the screw shaft. A pair of gears 241, 242, equal in size, are mounted, the one on the shaft 222 and the other on the countershaft 238, and when in service drive the screws at uniform speed.

A pair of gears 243, 244, mounted eccentrically one upon each of the last-named shafts, and another pair of gears 245, 246, similarly mounted upon these shafts but oppositely disposed from the gears 243, 244, provide for variations in the speed of the screws during each rotation of the latter.

When the screws are driven at uniform speed the increments of fuel deposited upon the loader 52 are without variation, and the feed to the fire-box is uniform over the entire grate area except as it may be varied by mechanism heretofore described and affecting the velocity and length of the stroke of the vanes, or by the action of the gate 202. When one pair of the eccentrically mounted gears is in action the vane at the right receives the excess and the vane at the left the reduced supply of fuel, and when the other set of eccentrically mounted gears is in action the vane at the left receives the excess and the vane at the right the reduced supply of fuel.

The gears 241, 243 and 245 are loose upon the shaft 222, and with each there is associated a clutch element 247, 248 and 249, splined upon the shaft and shifted by the shipper arms 250, 251 and 252, all of which are controlled by the hand lever 253 projecting upwardly through the floor of the tender and having associated with it the usual segment and latch, and which is connected to the shipper arms 250, 251 and 252 by means of a link rod 254 and a lever 255. The shipper arms 250 and 252 are rigidly attached to a bar 256, to which the lever 255 is attached, movement of this bar to its extreme position in either direction effecting the engagement of one of the clutch members 247, 249, with the gear with which it is associated. The shipper arm 251 is in the form of a bell crank, pivoted, as shown at 257, to the casing 237, its free arm being provided with a lateral stud 258, projecting into a cam slot 259, formed in the bar 256, the middle portion of this slot being given the shape of an inverted V. When the bar 256 is shifted to bring the stud 258 to the apex of the slot the shipper arm 251 is swung to engage the cam element 248 with the gear 241. Movement of the bar 256 in either direction from this position swings the shipper rod 251 away from the gear 241.

Preferably the fuel-throwing vanes are reduced in height at their outer ends in order that a considerable portion of the fuel swept forwardly by them will pass off of the end of the vane, by centrifugal action, before the completion of the forward stroke. A portion of the coal will be retained by the comparatively low wall at the curved end of the vane until the stroke is completed, and will then be deposited in the back end of the fire-box.

In the construction illustrated in Figs. 34 and 35, provision is made for adjustably varying the height of the end of the vane. The vane illustrated in these figures comprises a main body portion 260, projecting from a hub 261 adapted to fit upon the operating shaft and having along its rear wall a strengthening rib 262. The upstanding web of this vane is of uniform height to the point 263, at which its curvature commences, to form the hook end. Beyond this point the web is reduced in height, as shown at 264. A plate 265, the outer end of which is curved to the same contour, fits within the section 264 of the vane, its rearward end being flattened to fit against the upstanding web 260, to which it is pivotally secured, as shown at 266. The plate 265 may occupy the position indicated by dotted lines in Fig. 35, or may be raised to increase the height of the hook portion of the vane, and when so raised is secured in adjusted position by means of bolts, as 267, setting through curved slots, as 268, in the web 260.

This adjustability of the curved portion of the vane renders the latter readily adaptable to fire-boxes differing in size, in that it may be so adjusted as to cause the deposit of a greater or less amount of fuel upon the rearward portion of the grate.

In some furnaces it will be found desirable to have the end of the vane of greater curvature than in others, and in the construction illustrated in Figs. 36, 37 and 38 provision is made for varying such curvature. In this instance the body of the vane is the same as in Figs. 34 and 35, but the strengthening rib 262 is provided with a series of transverse slits, as 269, to permit the reduced end portion 270, which normally may have a curvature, as shown in Fig. 37, to be flexed to a greater curvature, as shown in Fig. 36. Series of binding plates, as 271, 272, are applied above and below the rib 262, one pair covering each of the slits, as 269, and through each pair of such plates is set a clamping bolt, as 273, thereby firmly securing the web 270 in the position to which it is bent. Preferably a flexible elastic plate 274 is bolted to the web 260, and tends to strengthen the curved portion of the vane.

In Figs. 39 and 40 there is shown a further modification of the vane. In this instance the hub portion 275 is provided with a short arm 276, forming the inner end of the vane, the outer end 277 of which is pivotally secured thereto, as shown at 278. An arm 279 projects inwardly from the hub of the vane section 277, and is provided with a pair of apertures, as 280, 281, which, in different positions of the outer end of the vane with reference to the arm 276, will register with a series of apertures, as 282, 283, formed in the top horizontal web of the arm 276. A locking pin 284, set through aligned apertures in the two members, will hold the outer end of the vane in its adjusted position. The vertical portion of the vane is extended at substantially its full height by means of a flexible plate 285, attached by means of rivets. The lower portion of the member 277 is continued and curved, as indicated at 286. A second flexible plate 287, of less height than the plate 285, is riveted to the forwarding face of the vertical web of the vane.

An eye bolt 288 is pivotally attached to the extension 286 and projects through an aperture in the plate 285. The application of a nut to the outer end of this bolt affords means for bending the plate to curve it forwardly, as indicated in dotted lines (Fig. 40). An adjusting screw 289, set through the extension 286, bears against the rearward face of the plate 287. By turning up the screw the curvature of the plate may be increased, as indicated in dotted lines.

In the form of construction illustrated in Figs. 39 and 40, a bottom plate 290 is shown as extending forwardly from the vertical web of the member 287. This bottom plate will cut under the fuel as the vane swings forwardly.

We have shown and described the stoker both as to its entirety and as to its various parts, which is operative and, so far as now advised, of the most desirable form.

The pivot shaft 291ª of the elevator 53 is journaled in boxes formed in but below the surface of the fixed portion of the bottom of the vane casing 47, and covered by caps 293, 293, which are readily removable. The elevator is, therefore, easily removed to give access to the mechanism below the casing.

In the construction as shown and described there is provided a complete stoking device including means for transferring fuel from the tender to the locomotive, and for delivering suitable charges into the zone of action of projecting or throwing elements which scatter it over the grate area of the fire box. It provides in several different ways for the trimming of the fire, that is to say, for securing a uniform depth of fuel over the entire grate area, or such variations in the depth of the fuel bed as may be thought desirable.

One method of trimming the fire consists in operating the fuel projecting elements, (here shown as swinging vanes, the one throwing the fuel to the right and the other to the left) alternatively or selectively. While these elements are normally operated alternately, provision is made for discontinuing the action of either one of them entirely, the other being operated at twice the frequency, or for omitting every other stroke of either and having such omitted stroke performed by the other vane. It is thought that this range of variation will be sufficient to adequately take care of any inequalities which may develop in the fuel bed, but further variations in the action of the two projecting elements may be made within the scope of the invention. Further, this feature of the invention, in its broadest aspects, is not dependent upon the particular form of the fuel projecting elements or the particular manner of applying power to them, or the specific means for varying their action, but will include any projecting mechanism comprising a plurality of elements for delivering fuel to the different zones of the grate area, and any means for selectively actuating such elements.

Again, the trimming of the fire may be accomplished, as shown, by varying the stroke of a mechanical projector, or varying the velocity, either with or without the alternative control of a plurality of such projectors.

Further, provision is made for trimming the fire by delivering into the zone of operation a plurality of mechanical projecting devices, each serving to a portion only of the grate area, variable increments of fuel, and this is accomplished either by varying the action of the elevator or other means for delivering separate increments of fuel to the projecting elements or by varying the size of successive increments delivered to the elevator. Such variations in the increments delivered to the elevator may be accomplished by varying the movement of the transferring means; by the peculiar form of the transferring means; by changing the position of the transferring means; or by interrupting at intervals the flow of a steadily advanced stream of fuel.

As to each of the several means provided for effecting the trimming action, while operative and desirable forms of construction are shown and described, various changes may be made within the scope of the invention.

We claim as our invention—

1. A stoker comprising a casing adapted to open to a fire-box, means for discharging fuel from the casing alternately to opposite sides of the box, means for delivering increments of fuel into the zone of action of the discharging means, and means for varying the volume of successive increments.

2. A stoker comprising a casing adapted to open to a fire-box, means to deliver fuel to said casing, reciprocating members for discharging fuel from the casing alternately to opposite sides of the box, and means for varying the volume of successive discharges.

3. A stoker comprising a casing adapted to open to a fire-box, means to deliver fuel to said casing, a pair of reciprocating members arranged in the casing for projecting fuel to the opposite sides of the box, means for delivering increments of fuel into the path of such members, and means for varying the volume of successive increments.

4. In a stoker a pair of swinging fuel delivering vanes, means for actuating the vanes, and means for varying the relative frequency of strokes of the vanes.

5. In a stoker, in combination, a pair of swinging fuel-delivering vanes, and means for actuating the vanes alternatively.

6. In a stoker, in combination, a pair of swinging fuel-delivering vanes, and means for actuating the vanes alternatively in selected order.

7. In a stoker, in combination, a pair of swinging fuel-delivering vanes, means for actuating the vanes alternately, and means for varying the order of the vane strokes.

8. In a stoker, in combination, a pair of swinging fuel-delivering vanes, means for actuating the vanes, and means for varying the order of the action of the two vanes from alternate strokes of the two vanes, to alternately three strokes of either vane to one stroke of the other, and to continuous action of either vane, the other vane being out of action.

9. A pair of swinging fuel delivering vanes arranged to act in alternation, and adjustable means for automatically varying the order of the strokes of the two vanes.

10. In a stoker, in combination, a casing adapted to communicate with a feed opening in a fire-box, a pair of swinging fuel-delivering vanes in the casing, and means for actuating the vanes alternatively.

11. In a stoker, in combination, a casing adapted to communicate with a feed opening in a fire-box, a pair of swinging fuel-delivering vanes in the casing, and means for actuating the vanes in selected order.

12. In a stoker, in combination, a casing adapted to communicate with a feed opening in a fire-box, a pair of swinging fuel-delivering vanes in the casing, means for actuating the vanes alternately, and means for varying the order of the strokes of the vanes without changing the frequency of the vane strokes.

13. In a stoker, in combination, a casing adapted to communicate with a feed opening in a fire-box, a pair of swinging fuel-delivering vanes in the casing, means for actuating the vanes, and means for varying the order of the action of the two vanes from alternate, to alternately three strokes of either vane to one stroke of the other, and to continuous action of either vane, the other vane being out of action.

14. In a stoker, in combination, a casing adapted to communicate with a feed opening in a fire-box, a pair of swinging fuel-delivering vanes in the casing, means for actuating the vanes alternately, and means for automatically varying the order of the strokes of the vanes without changing the aggregate number of strokes in a given time.

15. In a stoker, in combination, a pair of fuel delivering means for delivering to relatively different zones, and means for actuating such first-named means alternatively.

16. In a stoker, in combination, a pair of mechanical non-simultaneously acting fuel throwing means for delivering to different zones of a fire box, and means for actuating such first named means to cause fuel discharges thereby at uniform intervals, and means for varying the order of action of the two throwing means.

17. In a stoker, in combination, a pair of fuel delivering means for delivering to relatively different zones, means for actuating such first-named means and means for varying the order of the actuation of the first-named means.

18. In a stoker, in combination, a pair of fuel delivering means for delivering to relatively different zones, means for actuating such first-named means, and means for varying the order of actuation of such first-named means from alternate, to a ratio of one to three, and continuously as to one, the other being out of action.

19. In a stoker, in combination, a pair of mechanical fuel delivering means for delivering to relatively different zones, means for actuating such first-named means, and means for automatically varying the order of the actuation of the first-named means.

20. In a stoker, in combination, a pair of fuel impelling elements, a motor for advancing each element, a rotary member for withdrawing the elements, a detent for holding each element in retracted position, and means for releasing the detents alternatively.

21. In a stoker, in combination, a pair of fuel impelling elements, a motor for advancing each element, a rotary member for withdrawing the elements, a detent for holding each element in retracted position, and means for releasing the detents alternatively and in timed relation.

22. In a stoker, in combination, a pair of fuel impelling elements, a motor for advancing each element, a rotary member for withdrawing the elements, a detent for holding each element in retracted position, and means carried by the rotary member for releasing the detents alternatively.

23. In a stoker, in combination, a pair of spring-advanced swinging fuel impelling vanes, means for retracting the vanes, means for locking the vanes in retracted position, and means for releasing such locking means alternatively.

24. In a stoker, in combination, a pair of spring-advanced swinging fuel impelling vanes, means for retracting the vanes, means for locking the vanes in retracted position, means for releasing such locking means and means for varying the order of such release.

25. In a stoker, in combination, a pair of spring-advanced swinging fuel impelling vanes, means for retracting the vanes, automatically acting dogs for holding the vanes in retracted position, and means for tripping the dogs alternatively.

26. In a stoker, in combination, a pair of spring-advanced swinging fuel impelling vanes, means for retracting the vanes, automatically acting dogs for holding the vanes in retracted position, means for tripping the dogs, and means for varying the order of such tripping action.

27. In a stoker, in combination, a pair of spring-advanced swinging fuel impelling vanes, a pair of slide bars, a flexible element connecting each bar with the shaft of one of the vanes and arranged to be wound upon such shaft as the vane advances, and means for shifting the bars in the opposite direction of retracting the vanes.

28. In a stoker, in combination, a pair of spring-advanced swinging fuel impelling vanes, a pair of slide bars, a flexible element connecting each bar with the shaft of one of the vanes and arranged to be wound upon such shaft as the vane advances, and a rotative element engageable with the bars to shift them to retract the vanes.

29. In a stoker, in combination, a pair of spring-advanced swinging fuel impelling vanes, a pair of slide bars, a flexible element connecting each bar with the shaft of one of the vanes and arranged to be wound upon such shaft as the vane advances, a rotative element engageable with the bars to shift them to retract the vanes, and automatically acting dogs engageable with the bars for holding the vanes in retracted positions.

30. In a stoker, in combination, a pair of spring-advanced swinging fuel impelling vanes, a pair of slide bars, a flexible element connecting each bar with the shaft of one of the vanes and arranged to be wound upon such shaft as the vane advances, a rotative element engageable with the bars to shift them to retract the vanes, automatically acting dogs engageable with the bars for holding the vanes in retracted positions, and means carried by the rotative element for disengaging the dogs alternatively.

31. In a stoker, in combination, a pair of spring-advanced swinging fuel impelling vanes, a pair of slide bars, a flexible element connecting each bar with the shaft of one of the vanes and arranged to be wound upon such shaft as the vane advances, a rotative element engageable with the bars to shift them to retract the vanes, automatically acting dogs engageable with the bars for holding the vanes in retracted positions, means carried by the rotative element for disengaging the dogs, and means for varying the order of the action of the last-named means upon the two dogs.

32. In a stoker, in combination, a swinging spring-advanced fuel injecting vane, a slide bar operatively connected with the vane for effecting its retraction and movable in one direction by the advance movement of the vane, a rotative element engageable with the bar for moving it in the opposite direction to retract the vane, a detent for holding the vane in opposition to its actuating spring, and a trip carried by the rotative element for releasing the detent.

33. In a stoker, in combination, a pair of swinging spring-advanced fuel injecting vanes, a pair of slide bars operatively connected with the vanes for effecting their retraction, a rotative element engageable with the bars for actuating them, detents for holding the vanes in opposition to their actuating springs, and a trip carried by the rotative element for releasing the detents alternatively.

34. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents.

35. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents, and a pair of shiftable cams for advancing the trips for engagement with the detents.

36. In a stoker, in combination, a pair of swinging fuel injecting vanes, a spring for advancing each of said vanes, a retracting bar for withdrawing each vane and compressing said spring, a rotative element engageble with the bars for effecting their actuation, a detent for holding each bar after its actuation, a pair of trips carried by the rotative element for alternatively releasing the detents, a pair of shiftable cams for advancing the trips for engagement with the detents, a gear connected with the cams, and a rack bar engaging the gear.

37. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents, a pair of shiftable cams for advancing the trips for engagement with the detents, a gear connected with the cams, a rack bar engaging the gear, and a hand lever for shifting the rack bar.

38. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents, a pair of shiftable cams for advancing the trips for engagement with the detents, a gear connected with the cams, a rack bar engaging the gear, a hand lever for shifting the rack bar, and automatic means for reciprocating the rack bar in adjusted positions for varying the order of the release of the detents.

39. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents, a pair of shiftable cams for advancing the trips for engagement with the detents, a gear connected with the cams, a rack bar engaging the gear, a hand lever for shifting the rack bar, automatic means for reciprocating the rack bar in adjusted positions for varying the order of the release of the detents, such automatic means comprising a rotative crank, gears for turning the crank, power means for actuating the last-named gears, and manually controlled means for engaging said gears with such power means.

40. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents, a pair of shiftable cams for advancing the trips for engagement with the detents, a gear connected with the cams, a rack bar engaging the gear, a hand lever for shifting the rack bar, automatic means for reciprocating the rack bar in adjusted positions for varying the order of the release of the detents, such automatic means comprising a rotative crank, gears for turning the crank, power means for driving such gears, and means including manually controlled clutch mechanism for engaging the power means with the gears, said last-named means including a releasing cam for effecting the disengagement of the clutch mechanism, only when the crank is in a single position in its rotative movement.

41. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents, a pair of shiftable cams for advancing the trips for engagement with the detents, a gear connected with the cams, a rack bar engaging the gear, a reciprocating member, means for manually shifting such member, a crank carried by such member and connected with the rack bar, gears for turning the crank, and a clutch for connecting such gears to a source of power when the crank-carrying member is in different adjusted positions.

42. In a stoker, in combination, a pair of swinging fuel injecting vanes, a spring for advancing each of said vanes, a retracting bar for withdrawing each vane and compressing said spring, a rotative element engageable with the bars for effecting their actuation, a detent for holding each bar after its actuation, a pair of trips carried by the rotative element for alternatively releasing the detents, a pair of shiftable cams for advancing the trips for engagement with the detents, a gear connected with the cams, a rack bar engaging the gear, a reciprocating member, means for manually shifting such member, a crank carried by such member and connected with the rack bar, gears for turning the crank, and a clutch for connecting such gears to a source of power when the crank-carrying member is in different adjusted positions, such clutch means including a cam for effecting the clutch release only when the crank is in a single position of its cycle of rotation.

43. In a locomotive stoker, in combination, a fire-box, a casing open to the fire-box, an oscillating fuel elevator within the casing, a pair of oscillating vanes within the casing movable over the elevator for projecting fuel therefrom into the fire-box, and means for actuating such vanes alternatively.

44. In a locomotive stoker, in combination, a fire-box, a casing open to the fire-box, an oscillating fuel elevator within the casing, means for projecting fuel from such elevator into the fire-box, means for delivering fuel to the elevator when the latter is below the limit of its upward movement, and means for adjustably limiting the downward movement of the elevator.

45. In a stoker, in combination, a casing having an open end for communicating with a fire-box above the grates thereof, a section of the floor of the casing being pivoted for up and down oscillation, and means for projecting fuel forwardly from said section when the same is in elevated position.

46. In a stoker, in combination, a casing having an open end for communicating with a fire-box above the grates thereof, a section of the floor of the casing being pivoted at its forward end for up and down oscillation, and means for projecting fuel from said floor section.

47. In a stoker, in combination, a casing having an open end for communicating with a fire-box above the grates thereof, a section of the floor of the casing being pivoted for up and down oscillation, and means for oscillating such floor section, said floor section not being above a horizontal plane at its upward limit of movement.

48. In a stoker, in combination, a casing having an open end for communicating with a fire-box above the grates thereof, a section of the floor of the casing being pivoted for up and down oscillation, means for oscillating such floor section at regular time intervals, and means for projecting the fuel from said section in timed relation to the operation of said floor section.

49. In a stoker, in combination, a casing having an open end for communicating with a fire-box, a section of the floor of the casing being pivoted for up and down oscillation, means for oscillating such floor section, and means for variably limiting the downward travel of such section.

50. In a stoker, in combination, a casing having an open end for communicating with a fire-box, a section of the floor of the casing being pivoted for up and down oscillation, means for delivering fuel to such floor section at the end of its downward movement, and means for removing the fuel from said section at the end of its upward movement.

51. In a stoker, in combination, a casing having an open end for communicating with a fire-box, a section of the floor of the casing being pivoted for up and down oscillation, means for loading such floor section with fuel when in its lowered position, and oscillating vanes for projecting the fuel from said floor section when the same is in raised position.

52. In a stoker, in combination, an oscillating plate for elevating fuel, an oscillating pusher for delivering fuel to such plate when the latter is lowered, and means for varying the relative movement of said plate and pusher.

53. In a stoker, in combination, an oscillating plate for elevating fuel, an oscillating pusher for delivering fuel to such plate when the latter is lowered, and means for varying the downward travel of the plate.

54. In a stoker, in combination, an oscillating plate for elevating fuel, an oscillating pusher for delivering fuel to such plate when the latter is lowered, and means for varying the downward travel of the plate on alternate strokes.

55. In a stoker, in combination, a casing arranged to deliver to a fire-box, a section of the floor of the casing being oscillatable about a pivot at its forward end, a rotative shaft below the casing, a cam carried by the shaft and engageable with the oscillatable floor section for effecting the movement thereof, and means oscillatable in a substantially horizontal plane for projecting fuel from said floor section.

56. In a stoker, in combination, a casing arranged to deliver to a fire-box, a section of the floor of the casing being oscillatable about a pivot at its forward end, a rotative shaft below the casing, a cam carried by the shaft and engageable with the oscillatable floor section for effecting the movement thereof, a second rotative shaft having a rate of movement one-half of that of the first-named shaft, a pair of oppositely disposed axially shiftable cams carried by the second-named cams for limiting the downward movement of the oscillatable section, and a plurality of shoulders of varying height formed on the lower face of the oscillatable section for cooperating with each of the limiting cams.

57. In a stoker, in combination, a casing arranged to deliver to a fire-box, a section of the floor of the casing being oscillatable about a pivot at its forward end, a rotative shaft below the casing, a cam carried by the shaft and engageable with the oscillatable floor section for effecting the movement thereof, a second rotative shaft having a rate of movement one-half of that of the first-named shaft, a pair of oppositely disposed axially shiftable cams carried by the second-named cams for limiting the downward movement of the oscillatable section, and a plurality of shoulders of varying height formed on the lower face of the oscillatable section for cooperating with each of the limiting cams, and means for independently shifting each of the limiting cams.

58. In a stoker, in combination, a casing adapted for discharge into a fire-box, means for delivering fuel to the fire-box from the casing, means for supplying increments of fuel to the zone of action of the delivery means, means for advancing fuel from a source of supply to said casing, a vertically movable gate for intermittently interrupting the flow of advancing fuel, and means for varying the volume of successive increments of fuel delivered to the zone of action of said delivery means.

59. In a stoker, the combination with fuel injecting means, means for introducing into the zone of action of the injecting means separated increments of fuel, of a screw for transferring fuel from a source of supply to the last-named means, one end of the flight of the screw being radially enlarged, shiftable gearing for turning the screw, and means for adjusting such gearing to vary the velocity of the screw during each rotation thereof.

60. In a stoker, the combination with fuel injecting means, means for introducing into the zone of action of the injecting means separated increments of fuel, of a screw for transferring fuel from a source of supply to the last-named means, one end of the flight of the screw being radially enlarged, shiftable gearing for turning the screw, and means for adjusting such gearing to vary the velocity of the screw during each rotation thereof and through different portions of its cycle of movement.

61. In a stoker, an oscillatable fuel injecting vane having its outer end forwardly curved, and means for adjusting the curvature of such portion.

62. In a stoker, an oscillating fuel injecting vane comprising a hub, and a body portion attached to the hub and angularly adjustable with reference thereto.

63. A chamber arranged to deliver into a firebox, means for introducing increments of fuel into the chamber at regular time intervals, a pair of swinging vanes for discharging such increments as introduced, means for actuating the vanes non-simultaneously, and means for independently varying the frequency of the strokes of each vane.

64. In a stoker, in combination, a pair of swinging fuel-throwing vanes, means for delivering separate increments of fuel into the zone of action of the vanes, and means for varying the size of certain of the increments.

65. In a stoker, in combination, a pair of swinging fuel-throwing vanes, means for delivering separate increments of fuel into the zone of action of the vanes, and means for varying the size of successive increments.

66. In a stoker, in combination, means for projecting fuel into a firebox, an elevator for raising increments of fuel into the zone of action of such means, means for loading the elevator, and means for varying the size of the fuel increments delivered to the elevator.

67. In a stoker, in combination, means for projecting fuel into a firebox, a reciprocating elevator for raising increments of fuel into the zone of action of such means, means for loading the elevator, and means for varying the length of the elevator strokes.

68. In a stoker, in combination, means for projecting fuel into a firebox, a reciprocating elevator for raising increments of fuel into the zone of action of such means, means for loading the elevator, and means for varying the length of successive elevator strokes.

69. In a stoker, in combination, means for projecting fuel into a firebox, an elevator for raising increments of fuel into the zone of action of such means, a loader member, means including said loader member for loading the elevator, means for delivering fuel to the loader, and means for varying the rate of delivery to the loader.

70. In a stoker, in combination, means for projecting fuel into a firebox, an elevator for raising increments of fuel into the zone of action of such means, a loader member, means including said loader member for loading the elevator, and means for delivering alternately light and heavy charges of fuel to the loader.

71. In a locomotive stoker, in combination with a casing for delivering fuel into the firebox and with means for transferring fuel from the tender of the locomotive and delivering it to the casing in separate increments, and means for expelling the fuel increments from the casing, means for varying the action of one of the fuel moving means independently of the other to vary the delivery of fuel to different selected areas for the firebox grates.

72. In combination, a fuel feed plate for a stoker, means for supplying fuel to said plate, a plurality of movable members for throwing fuel from the plate, means for actuating said members and means for varying the order of the strokes of said members.

73. In combination, a fuel feed plate for a stoker, a pair of swinging vanes for throwing fuel from the plate, means for actuating the vanes to cause a succession of vane strokes at regular intervals, and means for varying the frequency of the strokes of each vane independently of the driving speeds.

74. In a stoker, in combination, a casing arranged to open into a firebox, a pair of swinging vanes for discharging fuel from the casing, means for actuating the vanes and arranged to cause vane strokes at regular intervals, and means for varying the relative frequency of the strokes of each vane without disturbing the regularity of vane strokes.

75. In a stoker, in combination, a casing arranged to open into a firebox, a pair of swinging vanes for discharging fuel from the casing, means for actuating the vanes and means for varying the frequency of the strokes of each vane independently of the driving speed.

76. In a stoker, a fuel feed plate, a pair of swinging vanes for throwing fuel from the plate, means for actuating the vanes, and adjustable means for controlling the actuating means to cause the vanes to act alternately at regular intervals or to suspend the action of one vane and double the frequency of the strokes of the other vane.

77. In a stoker, a fuel feed plate, a pair of swinging vanes for throwing fuel from the plate, means for actuating the vanes, and adjustable means for controlling the actuating means to cause the vanes to act alternately at regular intervals or to suspend the action of either vane and double the frequency of the strokes of the other vane.

78. In a stoker, a fuel feed plate, a pair of swinging vanes for throwing fuel from the plate, means for actuating the vanes to cause a regular succession of vane strokes, and means for adjustably varying the sequence of action of the two vanes.

79. In a stoker, a fuel feed plate, a pair of swinging vanes for throwing fuel from the plate, means for actuating the vanes to cause a regular succession of vane strokes, and means for adjustably varying the sequence of action of the two vanes to entirely suspend the operation of one vane, or to operate the two vanes in the ratio of one to one or of one to three.

80. In a locomotive stoker, a conveyor for transferring fuel from a source of supply to the locomotive, a gate movable across the forward portion of said conveyor for interrupting the flow of fuel along said conveyor, means for automatically operating said gate, and manually operated means for throwing the gate into and out of action.

81. In a stoker, in combination, a pair of spring advanced swinging fuel impelling vanes, means for retracting the vanes, means including automatically acting dogs for holding the vanes in retracted position, means for releasing the dogs, and means for regulating the action of the retracting means and the dog releasing means.

NATHAN M. LOWER.
ALBERT R. CHALKER.
PAUL A. KETCHPEL.